United States Patent [19]
Usui et al.

[11] Patent Number: 5,808,694
[45] Date of Patent: Sep. 15, 1998

[54] ELECTRONIC PROGRAM GUIDE SYSTEM AND ELECTRONIC PROGRAM GUIDE DISPLAYING METHOD

[75] Inventors: Hirofumi Usui, Tokyo; Naomasa Takahashi, Chiba; Peter Shintani, Tokyo, all of Japan

[73] Assignee: Sony Corporation, Tokyo, Japan

[21] Appl. No.: 609,716

[22] Filed: Mar. 1, 1996

[30] Foreign Application Priority Data

Mar. 31, 1995  [JP]  Japan .................................. 7-076592

[51] Int. Cl.⁶ .................................................. H04N 5/50
[52] U.S. Cl. .......................................... 348/569; 348/906
[58] Field of Search .................................. 348/563, 564, 348/569, 906; H04N 5/50, 5/445

[56] References Cited

U.S. PATENT DOCUMENTS

| | | |
|---|---|---|
| 4,691,351 | 9/1987 | Hayashi et al. . |
| 4,751,578 | 6/1988 | Reiter et al. . |
| 5,353,121 | 10/1994 | Young .................................. 348/563 |
| 5,479,266 | 12/1995 | Young .................................. 348/906 |
| 5,479,268 | 12/1995 | Young .................................. 348/906 |
| 5,550,576 | 8/1996 | Klosterman ............................ 348/906 |
| 5,596,373 | 1/1997 | White .................................... 348/906 |

FOREIGN PATENT DOCUMENTS

| | | |
|---|---|---|
| 6504165 | 5/1994 | Japan . |
| 8111823 | 4/1996 | Japan . |

OTHER PUBLICATIONS

"Most Recent MPEG Textbook", pp. 231–253, by ASCII Corporation, Aug. 1, 1994.

Nikkei Electronics magazine, No. 603, pp. 101–110 published by Nikkei PB Corporation, Mar. 14, 1994.

*Primary Examiner*—Sherrine Hsia
*Attorney, Agent, or Firm*—Jay H. Maioli

[57] ABSTRACT

It is an object of the present invention to provide an electronic program guide system and an electronic program guide displaying method that allow a desired program to be selected in a short time and at a high degree of reliability. EPG data of programs received by an IRD 4 through a satellite and EPG data of programs transmitted as a ground wave and received by a TV receiver 5 are converted into EPG data with an integrated format by an EPG receiver 6. The integrated EPG data is then output and displayed to the TV receiver 5.

21 Claims, 21 Drawing Sheets

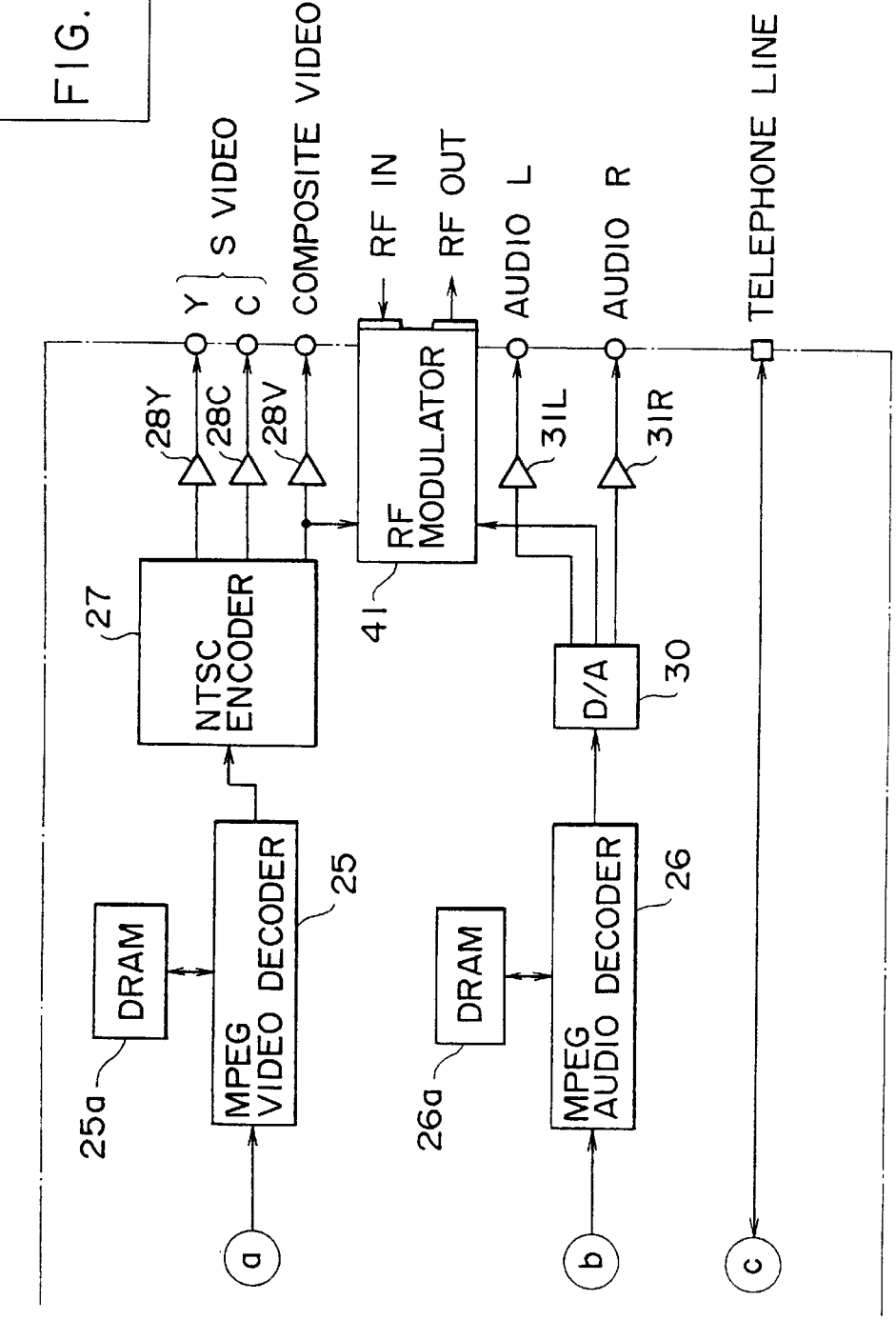

F I G. 12

|  | 9:00 | 10:00 | 11:00 |
|---|---|---|---|
| LOCAL A |  |  |  |
| LOCAL B |  | //// | //// |
| LOCAL C |  |  |  |
| CNN |  |  |  |
| MTV |  | //// | //// |
| M! |  |  |  |

CURSOR

F I G. 13

|  | 9:00 | 10:00 | 11:00 |
|---|---|---|---|
| CNN |  |  |  |
| MTV |  | //// | //// |
| M! |  |  |  |

F I G. 14

|  | 9:00 | 10:00 | 11:00 |
|---|---|---|---|
| LOCAL A |  |  |  |
| LOCAL B |  | //// | //// |
| LOCAL C |  |  |  |

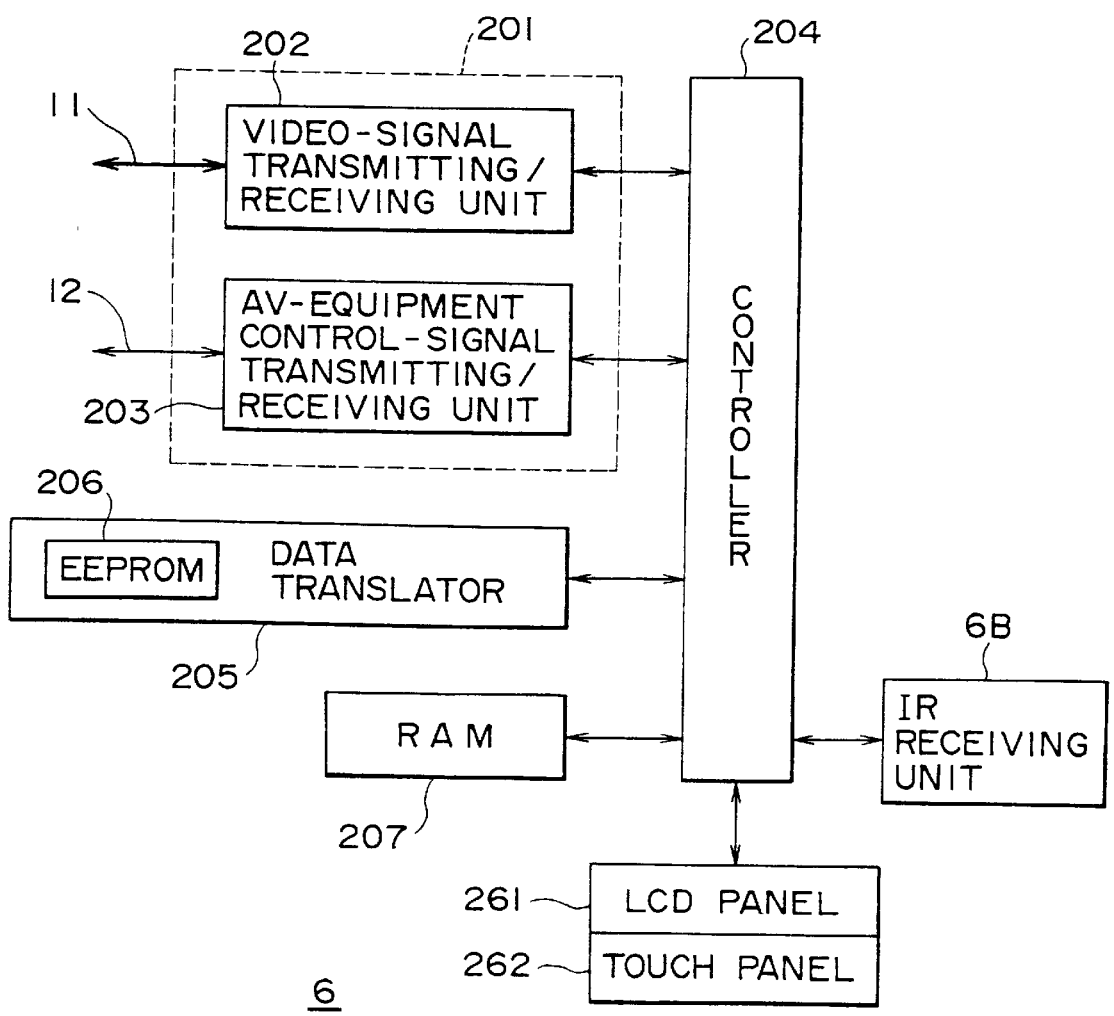

|        | 9:00 | 10:00 | 11:00 |
|--------|------|-------|-------|
| LOCAL A |      |       |       |
| LOCAL B |      |       |       |
| LOCAL C |      |       |       |
| CNN    |      |       |       |
| MTV    |      |       |       |
| M!     |      |       |       |

CURSOR

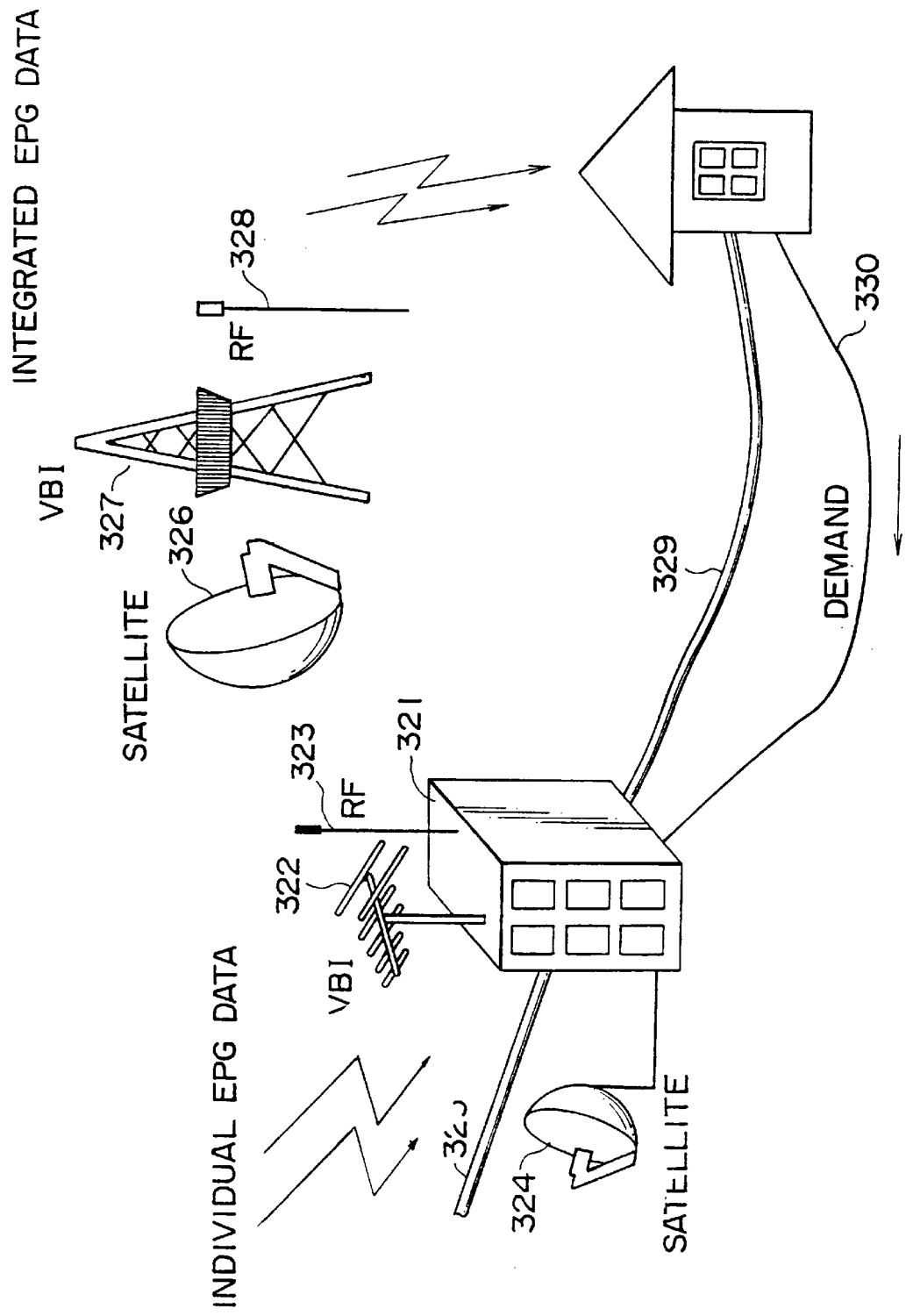

ELECTRONIC PROGRAM GUIDE SYSTEM AND ELECTRONIC PROGRAM GUIDE DISPLAYING METHOD

BACKGROUND OF THE INVENTION

In general, the present invention relates to an electronic program guide system and an electronic program guide displaying method. In particular, the present invention relates to an electronic program guide system and an electronic program guide displaying method that allow a telegraphic program guide to be obtained in a plurality of systems.

The so-called EPG (Electronic Program Guide) system is already known wherein a program guide for selecting a television broadcast program is transmitted by superpositioning the program guide on a video signal and displayed on a display unit on the receiver side.

Examples of the EPG system are a VBI (Vertical Blanking Interval) system disclosed in Japanese Patent Laid-open No. Hei 6-504165 and U.S. Pat. No. 5,353,121, a relevant patent, and a digital satellite system used in the DSS (Digital Satellite System), a trademark of Hughes Communication Corporation, which was explained by the applicant of the present invention in Japanese Patent Application No. Hei 6-325940. Japanese Patent Application No. Hei 6-325940 was filed in Japan on Dec. 27, 1994, but is not published yet.

In the case of the VBI system, VBI data composing an EPG (Electronic Program Guide) is inserted for transmission into a position which does not affect the native picture on the horizontal scanning lines in the ground-wave television broadcasting in the ordinary VHF (Very High Frequency) band. On the receiver side, this VBI data is accumulated and display data is then generated from the accumulated VBI data to be displayed on a monitor.

In the case of the digital satellite system, on the other hand, EPG data is digitized along with the native picture data and then converted into packets for transmission. On the receiver side, the EPG data is stored in memory. Necessary display data is then generated from the EPG data stored in the memory to be displayed on a monitor.

In either system, the user can select a program that the user desires to watch by looking at an electronic program guide displayed on the monitor.

Thus, a system for receiving ground-wave television broadcasts allows an EPG of the VBI method to be received and displayed on the monitor. A system for receiving satellite broadcasts, on the other hand, allows an EPG transmitted through a satellite to be received and displayed on the monitor.

As described above, EPGs are received by systems which work as functional units independent of each other. To be more specific, in order to know whether or not a program that the user desires to watch is broadcasted, whether it is a program broadcasted by using a ground wave or a satellite, for example, the user searches the EPG of the VBI method for information such as a date and time. If the desired program is not listed in the EPG, that is, not broadcasted, it is necessary to again search the EPG of the satellite broadcasting in a similar way. As a result, the user encounters a problem that it is difficult to watch a desired program reliably and immediately.

SUMMARY OF THE INVENTION

It is therefore an object of the present invention to provide an electronic program guide system and an electronic program guide displaying method which allow a desired program to be watched reliably and immediately.

According to a first aspect of the present invention, there is provided an electronic program guide system having a storage means for storing a first electronic program guide of a first system and a second electronic program guide of a second system different from the first system and an integrating means for integrating the first and second electronic program guides.

According to a second aspect of the present invention, there is provided an electronic program guide displaying method having the steps of storing a first electronic program guide of a first system and a second electronic program guide of a second system different from the first system, integrating the first and second electronic program guides and displaying an integrated electronic program guide.

According to a third aspect of the present invention, there is provided an electronic program guide system for transmitting electronic program guides different from area to area, and selecting an electronic program guide of a predetermined area on the receiving side, wherein information on mail-matter delivery areas is used for identifying an area to which a mail matter is to be delivered.

BRIEF DESCRIPTION OF THE DRAWINGS

FIG. 12 is a diagram showing a typical display resulting from the step S51 of FIG. 9;

FIG. 13 is a diagram showing a typical display of EPG data of the IRD 4 shown in FIG. 1;

FIG. 14 is a diagram showing a typical display of EPG data of the TV receiver 5 shown in FIG. 1;

FIG. 15 is a diagram showing another typical display resulting from the step S51 of FIG. 9;

FIG. 16 is a block diagram showing another typical configuration of the EPG receiver 6 shown in FIG. 1;

FIG. 25 is a diagram used for explaining an example of integrating EPG data through a relay base station.

DETAILED DESCRIPTION OF THE PREFERRED EMBODIMENTS

Figure 1:
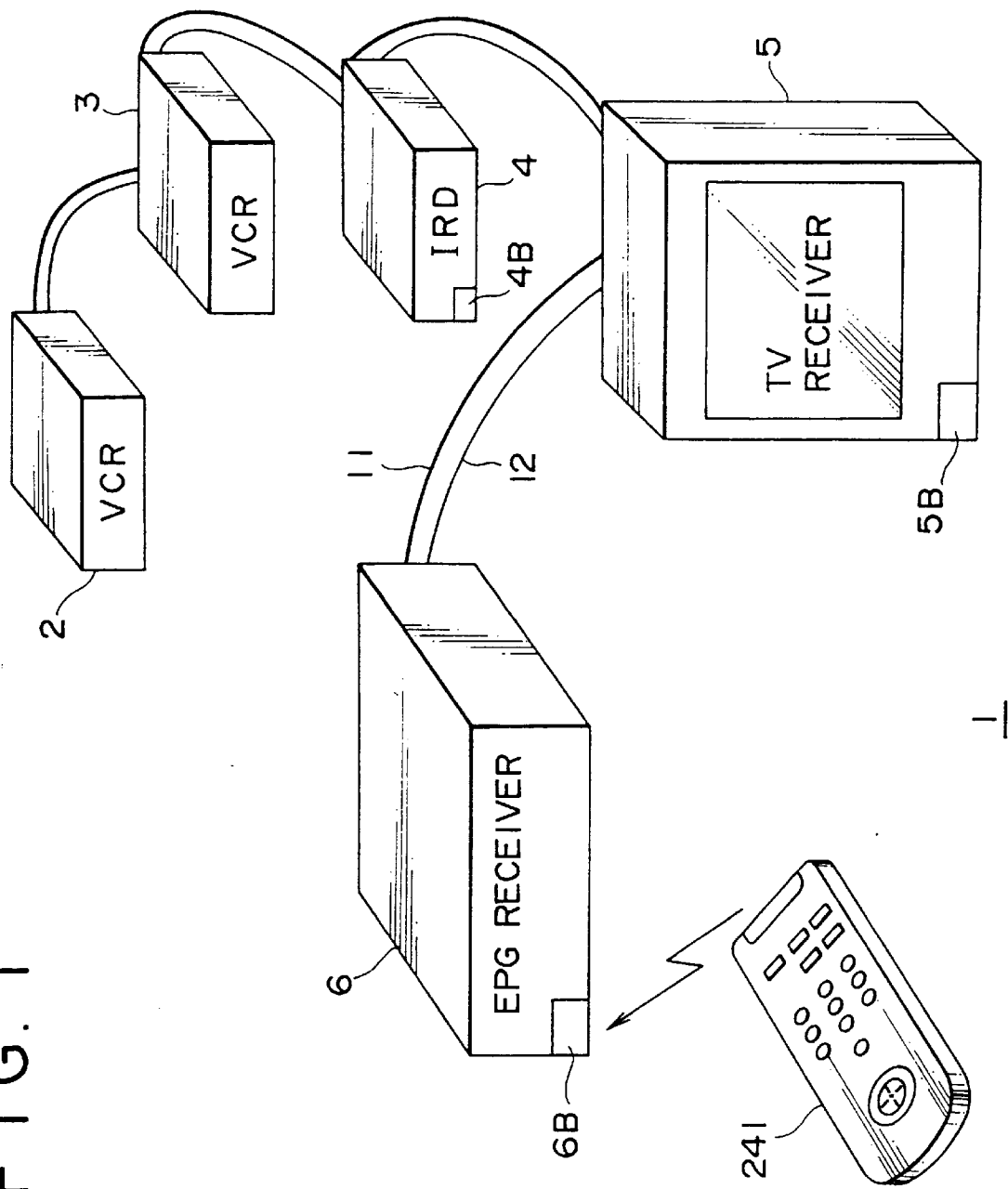
FIG. 1 is a diagram showing a typical configuration of an AV system adopting an electronic program guide system provided by the present invention.

FIG. 1 shows a typical configuration of an AV system 1 adopting an electronic program guide system provided by the present invention. In this AV system 1, VCRs (Video Cassette Recorders) 2 and 3, an IRD (Integrated Receiver/Decoder) 4, a television (TV) receiver 5 and an EPG receiver 6 are connected to each other by an AV line 11 and a control line 12.

The AV line 11 has three lines: a composite video signal line, an audio L signal line and an audio R signal line. If a translator 205 of FIG. 2 to be described later is not provided, the control line 12 can be designed into the same configuration as the wired SIRCS (or wired Sony Infrared Remote Control System). Accordingly, these pieces of AV equipment each has a video-signal transmitting/receiving unit for transmitting and receiving video and audio signals transmitted through the AV line 11 and an AV-equipment control-signal transmitting/receiving unit for transmitting and receiving control data transmitted through the control line 12.

In addition, the EPG receiver 6 has an IR receiving unit 6B for receiving an infrared (IR) signal generated by an EPG-receiver remote commander 241. Likewise, the IRD 4 and the TV receiver 5 have IR receiving units 4B and 5B respectively each for receiving an infrared signal generated by a remote commander 7 shown in FIG. 4.

Figure 2:
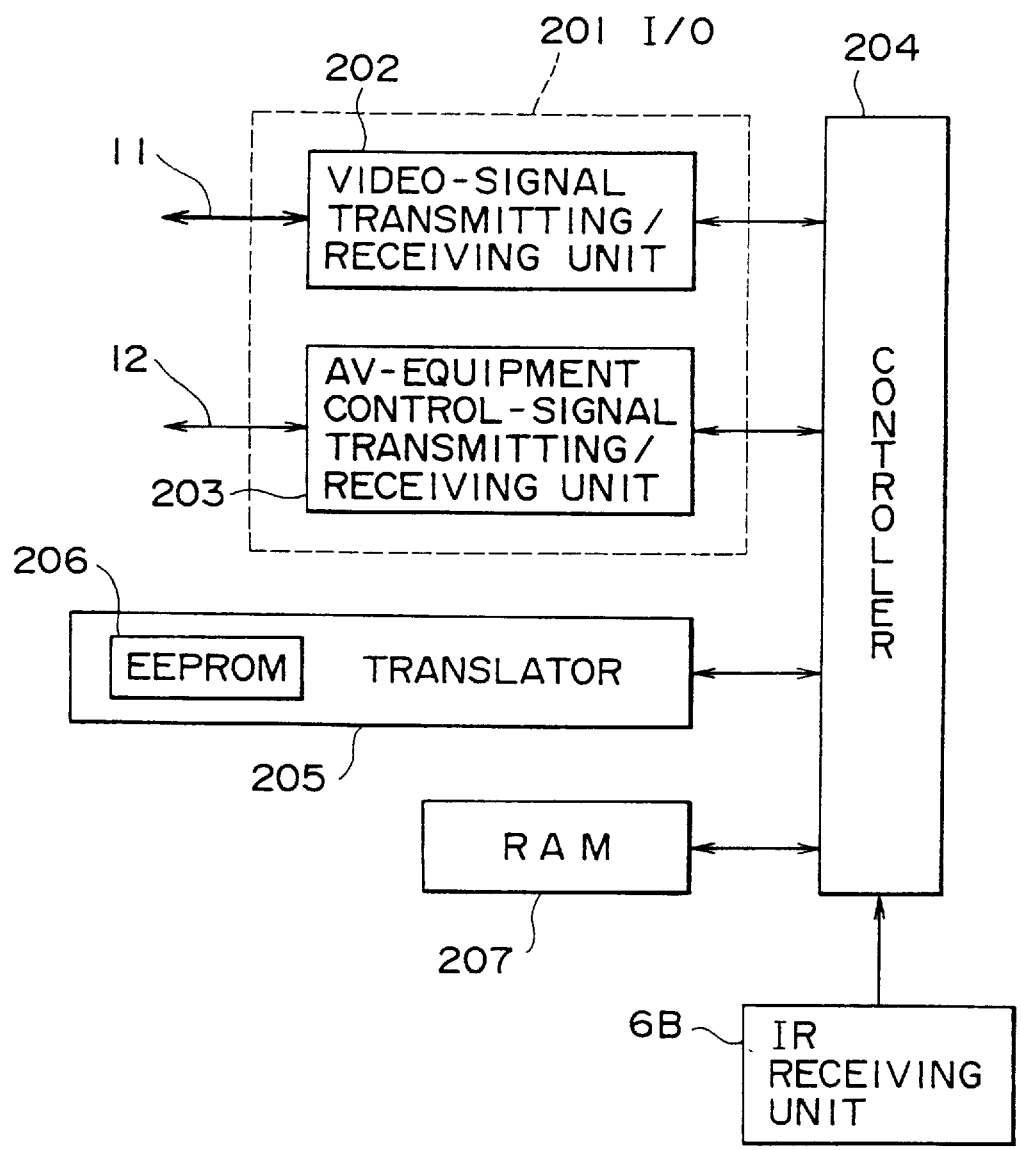
FIG. 2 is a block diagram showing a typical configuration of an EPG receiver 6 shown in FIG. 1.

A typical internal configuration of the EPG receiver 6 is shown in FIG. 2. As shown in the figure, an input/output (I/O) unit 201 comprises a video-signal transmitting/receiving unit 202 and an AV-equipment control-signal transmitting/receiving unit 203. The video-signal transmitting/receiving unit 202 executes operations to transmit and receive video and audio signals through the AV line 11. The AV-equipment control-signal transmitting/receiving unit 203, on the other hand, carries out processing to transmit and receive control data through the control line 12.

Embedding an EEPROM (Electrically Erasable Programmable Read-Only Memory) unit 206 as rewritable memory, the translator 205 converts commands to be transmitted to pieces of equipment composing the AV system 1, which pieces of equipment are made by different manufacturers, into commands interpretable by the pieces of equipment. Commands interpretable by the pieces of equipment made by different manufacturers are stored in the EEPROM unit 206 which can be replaced relatively with ease if necessary. A back-up RAM (Random-Access Memory) unit 207 is used for storing EPG data received from AV equipment connected to the AV system 1 as a data base. It should be noted that the RAM unit 207 can be replaced by an EEPROM unit. A controller 204 appropriately controls these circuits.

Figure 3A:
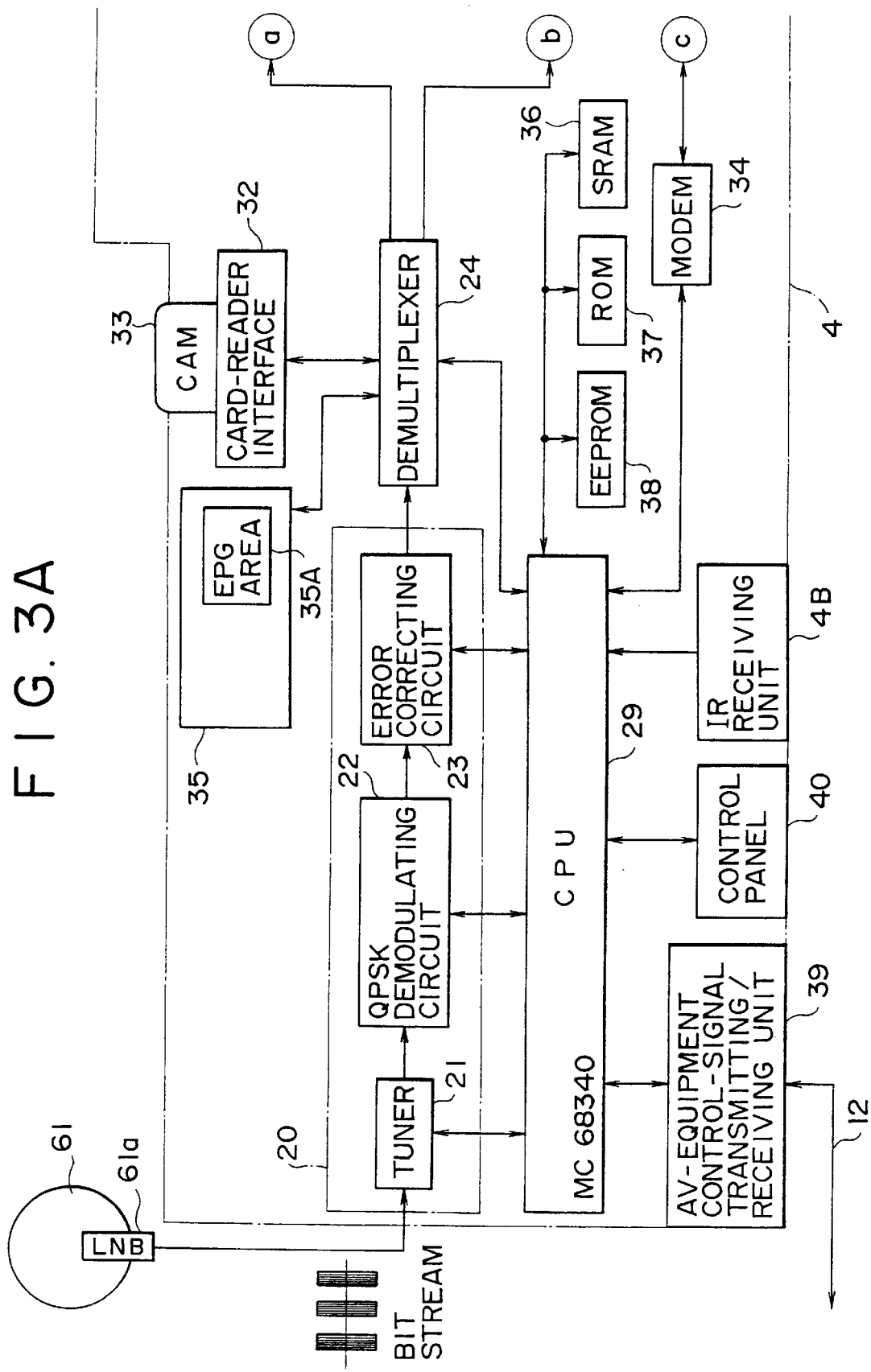
FIG. 3 formed by FIGS. 3A and 3B, and FIGS. 3A and 3B are block diagrams showing a typical configuration of an IRD 4 shown in FIG. 1.

A typical internal configuration of the IRD 4 for receiving satellite broadcasts is shown in FIG. 3. As shown in the figure, an RF signal which is actually a bit stream output by an LNB (Low Noise Block) downconverter 61a of a parabola antenna 61 is supplied to a tuner 21 of a front-end unit 20 for later demodulation. A signal output by the tuner 21 is supplied to a QPSK demodulating circuit 22 to undergo QPSK demodulation. A signal output by the QPSK demodulating circuit 22 is supplied to an error correcting circuit 23 for detecting as well as correcting errors and, if necessary, compensating the signal for the errors.

Keys necessary for decrypting encrypted codes are stored along with a decrypting program in a CAM (Conditional Access Module) 33 which is implemented as an IC card comprising, among other components, a CPU, a ROM (Read-Only Memory) unit and a RAM unit. In the case of an encrypted signal transmitted through a satellite, it is necessary to decrypt the encrypted signal using keys necessary for the decrypting. Keys are therefore read out from the CAM 33 through a card reader interface 33 and supplied to a demultiplexer (transport IC) 24. The demultiplexer 24 decrypts the encrypted signal by using these keys.

It should be noted that, in addition to the keys necessary for decrypting encrypted codes and the decrypting program, accounting information is also stored in the CAM 33.

Receiving a signal output by the error correcting circuit 23 of the front-end unit 20, the demultiplexer 24 supplies the signal to a data buffer SRAM (Static Random-Access Memory) memory unit 35 to be stored therein temporarily. The signal is then appropriately read out and decrypted video and audio signals are supplied to an MPEG (Moving-Picture Experts Group) video decoder 25 and an MPEG audio decoder 26 respectively.

The MPEG video decoder 25 supplies the input digital video signal to a DRAM unit 25a to be stored temporarily therein. The MPEG video decoder 25 decodes the video signal which has been compressed in accordance with the MPEG method. The decoded video signal is then supplied to an NTSC encoder 27 for converting the signal into a luminance signal (Y), a chroma signal (C) and a composite signal (V) of the NTSC system. The luminance and chroma signals (Y) and (C) are each output as an S video signal through buffer amplifiers 28Y and 28C respectively. The composite signal is, on the other hand, output to the video signal line of the AV line 11 through a buffer amplifier 28V.

It should be noted that an MPEG2 decoding LSI (STi 3500) made by SGS—Thompson Microelectronics can be used as the MPEG video decoder 25. An overview of this product is introduced by Martin Bolton in documents such as the Nikkei Electronics magazine of Mar. 14, 1994, No. 603, Pages 101 to 110 which magazine is published by Nikkei PB Corporation.

As for MPEG2—Transportstream, explanation can be found on pages 231 to 253 of 'Most Recent MPEG Textbook' published on Aug. 1, 1994 by ASCII Corporation.

The MPEG audio decoder 26 supplies the digital audio signal supplied by the demultiplexer 24 to a DRAM unit 26a to be stored temporarily therein. The MPEG audio decoder 26 decodes the audio signal which has been compressed in accordance with the MPEG method. The decoded audio signal is converted into an analog signal by a D/A converter 30. An audio signal of the left channel is output to the audio L signal line of the AV line 11 through a buffer amplifier 31L whereas an audio signal of the right channel is output to the audio R signal line of the AV line 11 through a buffer amplifier 31R.

An RF modulator 41 converts the composite signal (V) output by the NTSC encoder 27 and an audio signal output by the D/A converter 30 into an output RF signal. In addition, when a TV mode is set, the RF modulator 41 passes on an RF signal of the NTSC system supplied by AV equipment such as a cable box to other AV equipment such as a VCR, outputting the RF signal as it is.

In the case of this embodiment, these video and audio signals are supplied to the VCRs 2 and 3, the TV receiver 5 and the EPG receiver 6 through the AV line 11.

The CPU 29 executes various kinds of processing in accordance with a program stored in the ROM unit 37 and uses a data buffer SRAM memory 36. An example of the processing is control of the components such as the tuner 21, the QPSK demodulating circuit 22 and the error correcting circuit 23. The CPU 29 also controls an AV-equipment control-signal transmitting/receiving unit 39 to be described later. In addition, the CPU 29 also outputs predetermined control signals to other AV equipment such as the VCRs 2 and 3, the TV receiver 5 and the EPG receiver 6 in the case of this embodiment through the control line 12 as well as receives control signals from other AV equipment.

Figure 4:
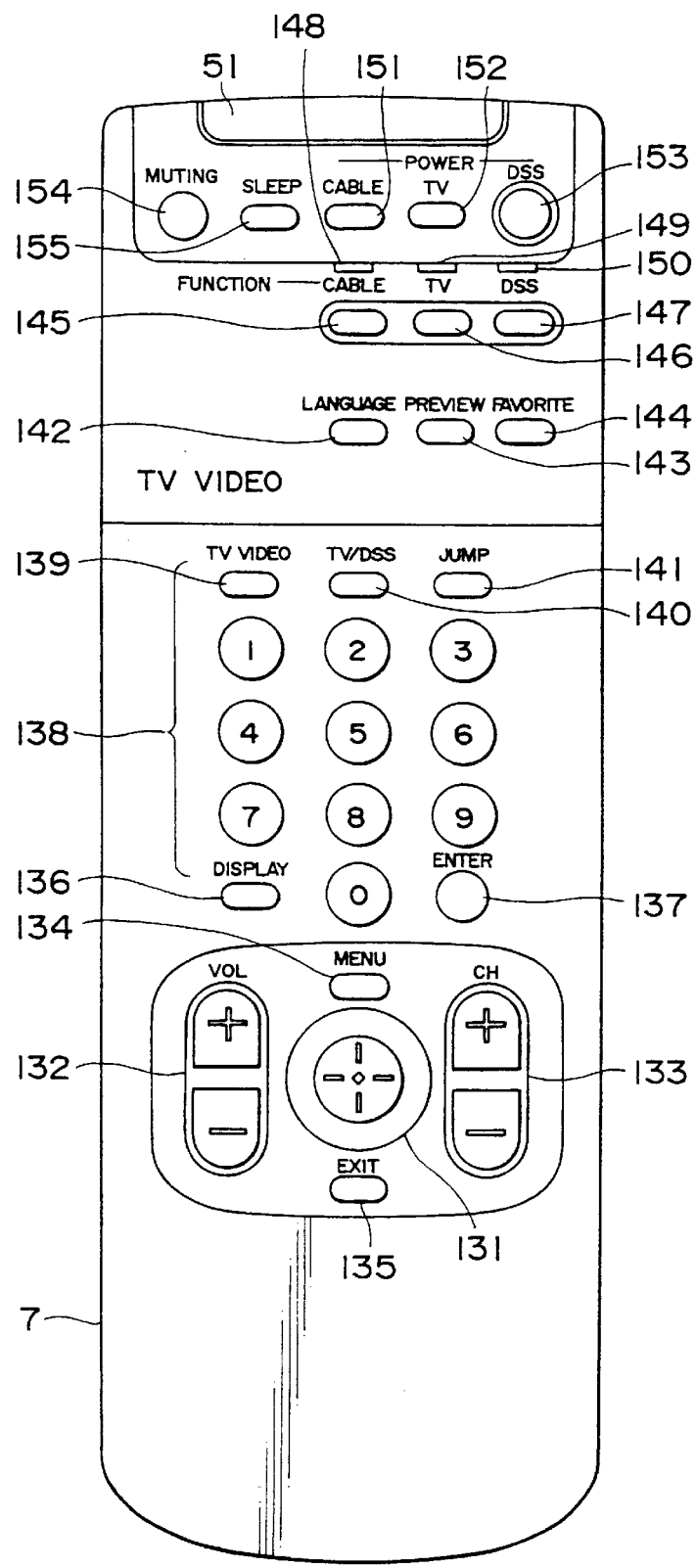
FIG. 4 is a block diagram showing a typical configuration of a remote commander for controlling the IRD 4 shown in FIG. 3.

Predetermined commands can be directly entered to the CPU 29 by operating operation button switches on a front panel 40. When the remote commander 7 shown in FIG. 4 is operated, an infrared signal is radiated by an IR generating unit 51 of the remote commander 7. The infrared signal is received by the IR receiving unit 4B and a result of the light reception is supplied to the CPU 29. In this way, a predetermined command can also be entered to the CPU 29 as well by operating the remote commander 7.

In addition, the demultiplexer 24 also takes in other information such as EPG data besides the MPEG video and audio data supplied by the front-end unit 20. The information is supplied to an EPG area 35A of the data buffer memory unit 35 to be stored therein. The EPG information includes information on programs of broadcasting channels which programs start from the present point of time and end at a point of time several tens of hours later after the present point. Pieces of such information are a program channel, a transponder number, a broadcasting time, a title, a category, film stars performing in a program and others. Since the EPG information is transmitted frequently, it is possible to always keep the most recent EPG in the EPG area 35A.

The EEPROM unit 38 is used for appropriately storing data which needs to be kept even after the power supply is turned off. Examples of such data are a history of reception for the last four weeks of the tuner 21 and a receiving channel prior to the turning-off of the power supply or the last channel. When the power supply is turned on again, a program of the last channel is received once more. If the last channel is not recorded, a program of a channel recorded in the ROM unit 37 as a default is received. When a sleep mode is set, the CPU 29 puts as many circuits as required to a minimum operative state even with the power supply turned off and updates the present time by using time information included in a received signal, allowing control and other commands to be executed so as to request the circuits to carry out predetermined operations at predetermined times. The circuits include the front-end unit 20, the demultiplexer 24 and the data buffer memory unit 35. For example, timer automatic recording is performed by interlocking the VCRs 2 and 3.

In addition, in order to generate predetermined OSD (On-Screen Display) data, the CPU 29 controls the MPEG video decoder 25. Controlled by the CPU 29, the MPEG video decoder 25 generates the predetermined OSD data and then writes the data into an OSD area in the DRAM unit 25a. The data is further read out from the DRAM unit 25a and output. By doing so, an electronic program guide including data such as predetermined characters and drawings, a menu and other information can be output and displayed to the TV receiver 5 appropriately.

The CPU 29 can also communicate with other apparatuses through the telephone line by controlling a modem 34.

FIG. 4 shows a typical configuration of button switches on the remote commander 7 for remotely controlling the IRD 4. Not only can a select button switch 131 be operated in a total of 8 horizontal directions, but it can also be pressed downward in a direction perpendicular to the upper surface of the remote commander 7. The 8 horizontal directions are the upward, downward, left and right directions in addition to the 4 slanting directions between the upward, downward, left and right directions. The operations in the 8 directions are known as directional operations whereas the downward pressing is referred to as a select operation. A menu button switch 134 is operated to display a menu screen to the TV receiver 5. An exit button switch 135 is operated typically when it is desired to return to the ordinary original screen.

A channel up-down button switch 133 is operated to increment or decrement the number of the received broadcasting channel. A volume button switch 132 is operated to increase or decrease the volume.

Each of numeric button (ten-key) switches 138 marked with the numbers 0 to 9 is operated to enter a number displayed as a mark on the switch. An enter button switch 137 is operated right after a numeric button switch 138 has been pressed to indicate that the operation to enter the number has been completed. When the channel is switched from a number to another, a banner comprising the number of the new channel, a call sign (or a name), a logo and a mail icon is displayed for 3 seconds. In addition to such a banner, there is another type of banner to give a total of two banner types. The other banner further includes information such as the name of a program, a broadcasting start time and the present time besides the simple configuration of the first banner. A display button 136 is operated to switch the displayed banner from one type to another.

Figure 5:
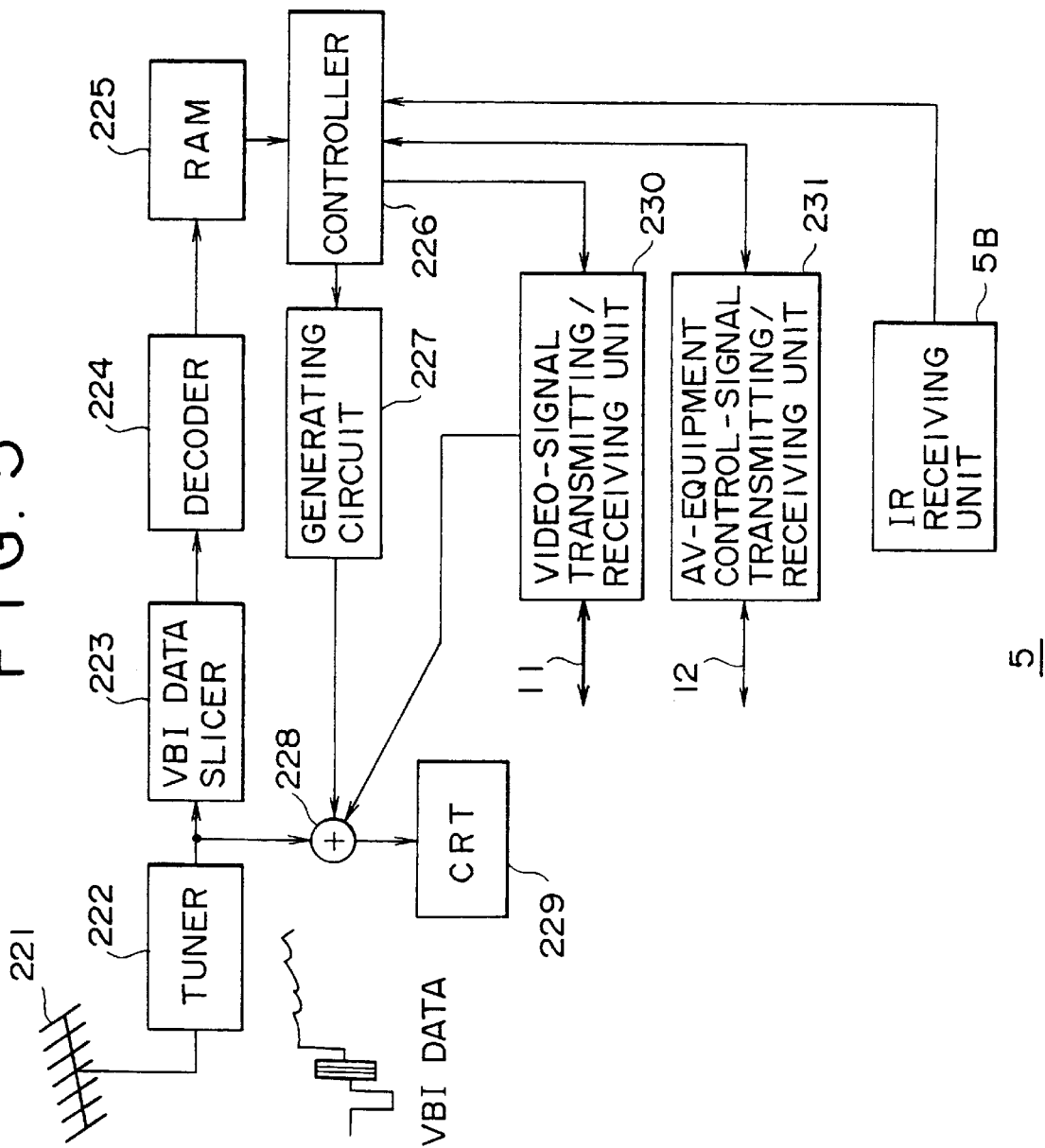
FIG. 5 is a block diagram showing a typical configuration of a TV receiver 5 shown in FIG. 1.

A television/video changeover button switch 139 is operated to switch the input to the TV receiver 5 from an embedded tuner 222 shown in FIG. 5 to an input terminal which is typically connected to the VCR 2 or 3 or vice versa. A television/DSS changeover button switch 140 is operated to select either a television mode for receiving a VHF ground wave or a DSS mode for receiving a satellite broadcast. When the channel number is changed by operating the numeric button switches 138, the channel number prior to the change is recorded in memory. A jump button switch 141 is operated to return to the channel number prior to the change.

A language button 142 is operated to select a predetermined language when a program is broadcasted in two languages or more. A guide button switch 143 is operated to directly display an electronic program guide to the TV receiver 5 without specification through a menu. A favorite button 144 is operated to select a favorite channel that has been previously entered.

A cable button switch 145, a television switch 146 and a DSS button switch 147 are used for switching from one function to another. To be more specific, they are used for switching the equipment category for which the code is conveyed by an infrared signal radiated by the remote commander 7. The cable button switch 145 is operated in order to request a cable box, not shown in the figure, to receive a signal transmitted through a cable and display the signal to the TV receiver 5. The code of an equipment category assigned to the cable box is thereby output as the infrared signal.

Similarly, the television button switch 146 is operated in order to display a signal received by a tuner embedded in the TV receiver 5 whereas the DSS button switch 147 is operated to request the IRD 4 to receive a signal through a satellite and display the signal to the TV receiver 5. A LED 148, 149 or 150 lights up when the cable button switch 145, the television button switch 146 or the DSS button switch 147 is turned on respectively. The lighted LED 148, 149 or 150 indicates a category of equipment, a code of which category is transmitted by the remote commander 7.

A cable power-supply button switch 151, a television power-supply button switch 152 or a DSS power-supply button switch 153 is operated to turn on or off the cable box, the TV receiver 5 or the IRD 4 respectively.

A muting button switch 154 is operated to set or reset the muting state of the TV receiver 5. A sleep button switch 155 is operated to set or reset the sleep mode, in which the power supply is turned off automatically, when a predetermined point of time has been reached or a predetermined period of time has lapsed.

A typical internal configuration of the TV receiver 5 is shown in FIG. 5. A tuner 222 demodulates a signal received by a VHF antenna 221 and outputs and displays the demodulated signal to a CRT 229 through a synthesizing circuit 228. In addition, a VBI data slicer 223 extracts VEI data from a signal output by the tuner 222 and outputs an extracted result to a decoder 224. The decoder 224 decodes the VBI data output by the VBI data slicer 223, generating EPG data which is then stored in a backed-up RAM unit or an EEPROM unit 225.

Based on the EPG data stored in the RAM unit 225, a controller 226 controls a generating circuit 227 for generating OSD data (or display data) which is then output and displayed to the CRT 229 through the synthesizing circuit 228.

A video-signal transmitting/receiving unit 230 executes processing to transmit and receive video and audio signals through the AV line 11. Likewise, an AV-equipment control-signal transmitting/receiving unit 231 executes processing to transmit and receive control signals through the control line 12. The IR receiving unit 5B receives an infrared signal from the remote commander 7, outputting a reception detecting signal to the controller 226.

Figure 6:
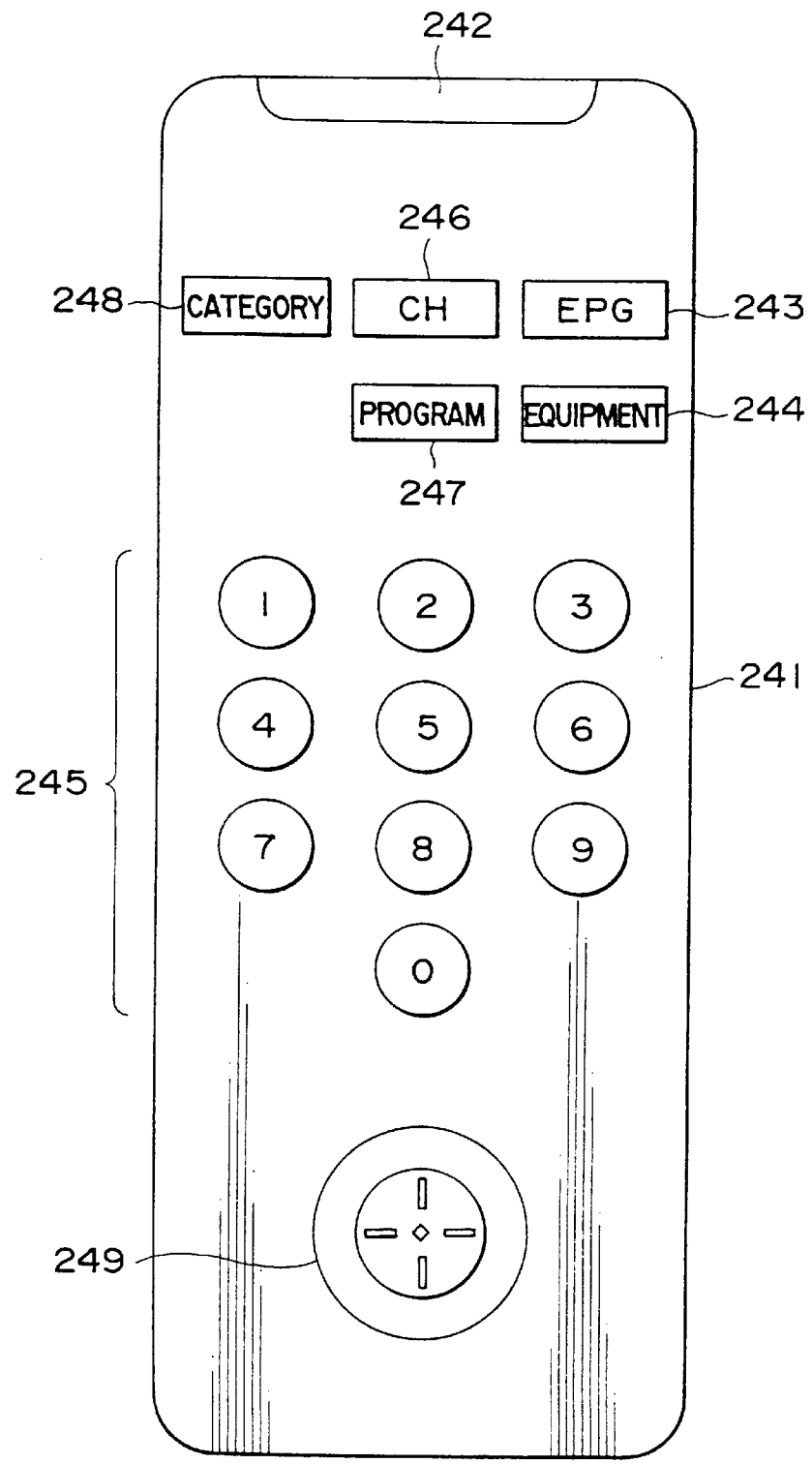
FIG. 6 is a diagram used for explaining button switches of an EPG-receiver remote commander 241 shown in FIG. 1.

FIG. 6 shows a typical configuration of an EPG-receiver remote commander 241 which is used for remotely controlling the EPG receiver 6. An EPG button switch 243 on the remote commander 241 is operated in order to display an integrated electronic program guide to the TV receiver 5. An equipment button switch 244 is operated in order to specify an electronic program guide to be integrated. In the case of this embodiment, for example, even though both the IRD 4 and the TV receiver 5 have a function for receiving an EPG, when it is desired to display an electronic program guide of any arbitrary one of these pieces of equipment such as the TV receiver 5, the equipment button switch 244 is operated. Subsequently, at this AV system 1, a numeric character representing a number assigned to the TV receiver 5 is entered by operating a key of the numeric button switches 245.

When it is desired to specify a channel, a program or a program category, a channel button switch 246, a program button switch 247 or a category button switch 248 is operated respectively before operating the numeric button switches 245. A select button switch 249 is operated in order to carry out directional and select operations much like the select button switch 131 of the remote commander 7 shown in FIG. 4.

When a button switch is operated, an infrared signal representing the operated button switch is radiated from an IR generating unit 242 and received by the IR receiving unit 6B employed in the EPG receiver 6.

Figure 7:
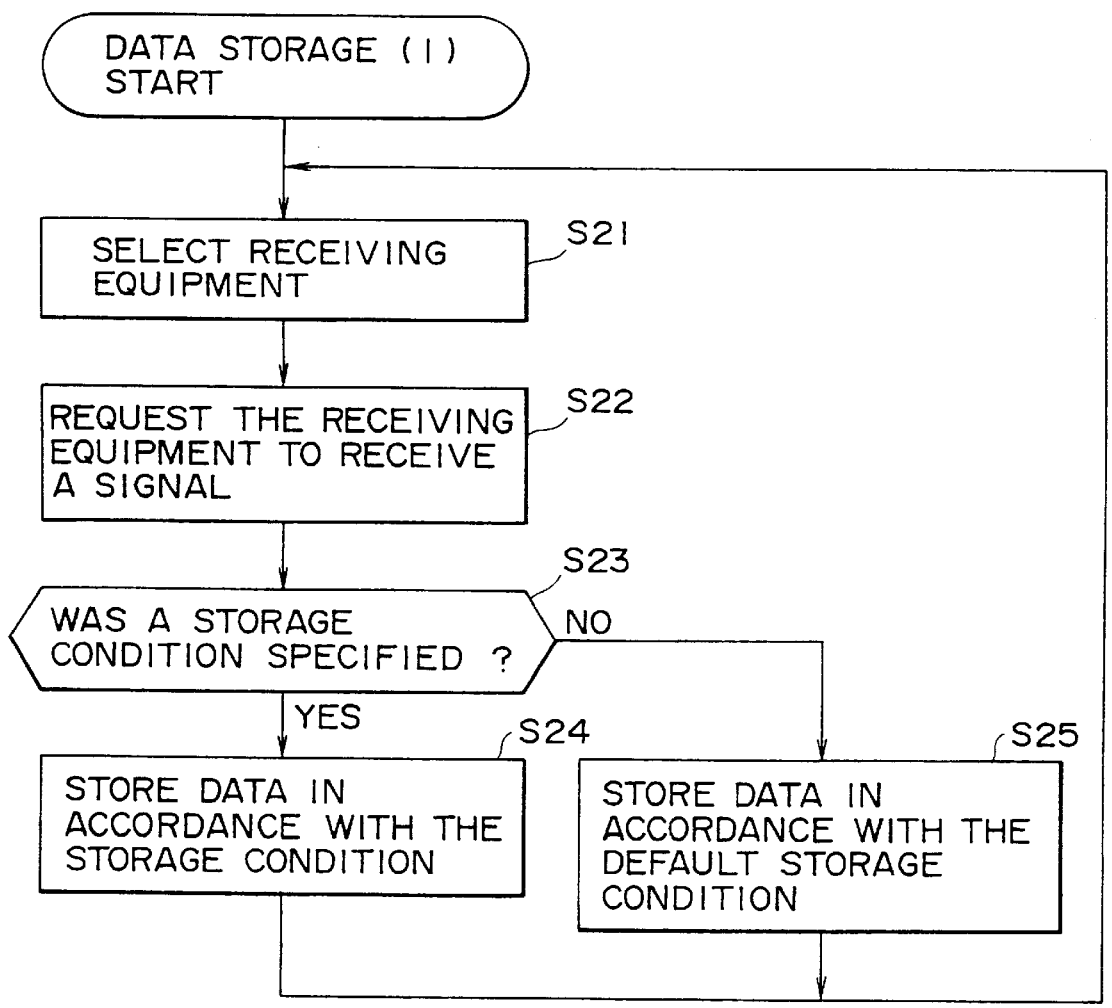
FIG. 7 shows a flowchart used for explaining an operation to store data in the EPG receiver 6 shown in FIG. 2.

When the power supply of the EPG receiver 6 is turned on, the controller 204 employed in the EPG receiver 6 executes processing to store EPG data in accordance with a flowchart shown in FIG. 7. First of all, at a step S21, the controller 204 selects receiving equipment for receiving EPG data among pieces of AV equipment connected to the AV system 1. For example, let the IRD 4 be selected initially. The processing flow then continues to a step S22 at which the controller 204 requests the selected receiving equipment to receive EPG data. To put it in more detail, the controller 204 requests the IRD 4 to receive EPG data through the AV-equipment control-signal transmitting/receiving unit 203 and the control line 12.

The IRD 4 receives this command through an AV-equipment control-signal transmitting/receiving unit 39. The manufacturer of the EPG receiver 6 is not necessarily the same as that of the IRD 4. As a matter of fact, they are usually different from each other. In this case, commands for controlling theses pieces of AV equipment are also different from each other. For this reason, when the controller issues a command to the IRD 4, requesting the IRD 4 to receive EPG data, this command is first supplied to the translator 205 for converting the command into a command known by the manufacturer of the IRD 4. Commands used in systems made by different manufacturers are stored in the EEPROM unit 206 so that the translator 205 can convert a command supplied thereto into one of the commands stored in the EEPROM unit 206. In this example, the translator 205 converts the command supplied by the controller 204 into a command known by the manufacturer of the IRD 4 in accordance with the data stored in the EEPROM unit 206.

It should be noted that, in the case of the AV system 1 to which pieces of AV equipment are connected, the controller 204 makes inquiries about the names of manufacturers to the AV equipment through the control line 12 and stores the manufacturer names in the RAM unit 207. A command used in a system made by a manufacturer, the name of which is stored in the RAM unit 207, is then output to the translator 205.

Accordingly, the CPU 29 employed in the IRD 4 can receive this command as a proper command through the AV-equipment control-signal transmitting/receiving unit 39. Receiving this command, the CPU 29 controls the demultiplexer 24, requesting the demultiplexer 24 to read out EPG data from the EPG area 35A of the data buffer memory unit 35. As described above, the contents of the EPG area 35A are always updated so that the most recent EPG data is stored therein.

The EPG data read out by the CPU 29 is then output to the EPG receiver 6 through the AV-equipment control-signal transmitting/receiving unit 39 and the control line 12.

The controller 204 employed in the EPG receiver 6 receives the EPG data through the AV-equipment control-signal transmitting/receiving unit 203.

The processing flow then proceeds to a step S23 to find out whether or not the user has specified a condition for storing the EPG data by operating the EPG-receiver remote commander 241. If no condition is specially specified, the processing flow continues to a step S25 to store the EPG data into the RAM unit 207 under a condition prescribed in advance as a default. In this case, basically, a minimum amount of information on programs of all channels such as broadcast channels, transponder names, program names and broadcasting times, which information is required for selecting a program, is stored.

If a condition for storing the EPG data is found specified by the user at the step S23, on the other hand, the processing flow continues to a step S24 to store the EPG data into the RAM unit 207 under the condition.

For example, the user can specify a predetermined channel as an EPG to be integrated (that is, an EPG to be stored in the RAM unit 207) by operating the EPG-receiver remote commander 241. In this case, the channel is specified by operating the channel button switch 246 and the numeric button switches 245 of the remote commander 241. In addition, when it is desired to store only EPG data of programs pertaining to a predetermined category into the RAM unit 207, the predetermined category can be specified by operating the category button switch 248 and the numeric button switches 245. Furthermore, when it is desired to store EPG data of a predetermined program into the RAM unit 207, a number specifying the predetermined program can be entered by operating the program button switch 247 and the numeric button switches 245.

When a condition for storing EPG data is specified as described above, the controller 204 stores the EPG data into the RAM unit 207 in accordance with the specified condition.

The processing flow then returns to the step S21 to select another piece of receiving equipment. For example, the TV receiver 5 is selected as receiving equipment. The processing flow then continues to the step S22 at which the controller 204 requests the TV receiver 5 to receive EPG data. The request is also converted by the translator 205 into a command provided by the manufacturer of the TV receiver 5 which command is stored in the RAM unit 207 in advance. The command resulting from the conversion is then supplied to the AV-equipment control-signal transmitting/receiving unit 231 employed in the TV receiver 5.

Receiving this input command from the AV-equipment control-signal transmitting/receiving unit 231, the controller 226 employed in the TV receiver 5 reads out EPG data stored in the RAM unit 225. In case no EPG data is stored in the RAM unit 225, the tuner 222 is controlled so as to receive EPG data which is then stored into the RAM unit 225. The stored EPG data is then read out and output to the EPG receiver 6 through the AV-equipment control-signal transmitting/receiving unit 231 and the control line 12.

The controller 204 employed in the EPG receiver 6 receives the EPG data through the AV-equipment control-signal transmitting/receiving unit 203. As described earlier, in this case, if a condition for storing the EPG data is found specified by the user at the step S23, the processing flow continues to the step S24 to store the EPG data into the RAM unit 207 under the specified condition. If no condition is specially specified, on the other hand, the processing flow continues to the step S25 to store the EPG data into the RAM unit 207 under a condition prescribed in advance as a default.

As described above, each piece of AV equipment connected to the AV system 1 is requested to receive EPG data by the RAM unit 207. In response to the request, EPG data which is received or stored in advance is collected and stored in the RAM unit 207.

It should be noted that, in the processing shown as a flowchart in FIG. 7, the EPG data received by the IRD 4 and the TV receiver 5 is basically stored in the RAM unit 207 with its formats remaining unchanged as they are. Thus, for example, pieces of EPG data of essentially the same programs for the IRD 4 and the TV receiver 5, are basically all stored in the RAM unit 207, whether they are of programs broadcasted at the same time or different times. As a result, a large capacity of the RAM unit 207 is required in comparison with that used in a flowchart of FIG. 8 to be described later wherein data is stored by integrating the data into a uniform format. With the formats unchanged as they are, however, operatability can be improved by unifying the formats at the display stage as shown in a flowchart of FIG. 10 also to be described later.

Figure 8:
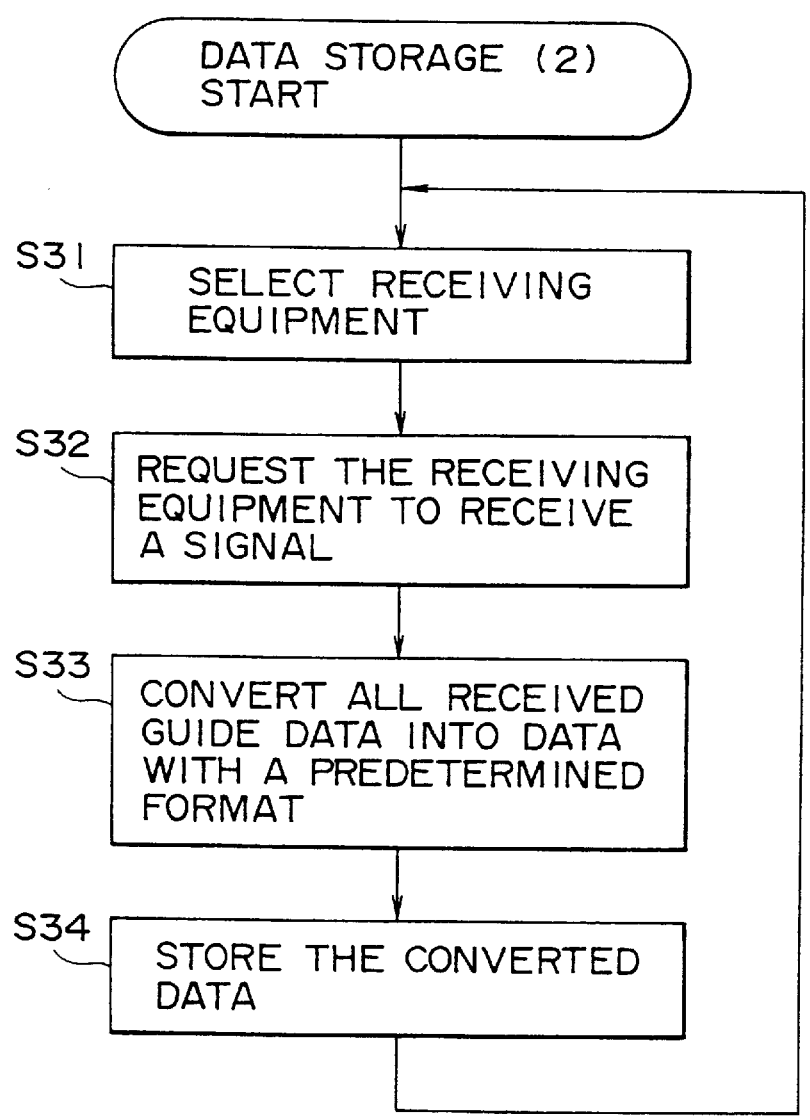
FIG. 8 shows a flowchart used for explaining another operation to store data in the EPG receiver 6 shown in FIG. 2.

Another processing example to store EPG data is shown in FIG. 8. In the case of this embodiment, receiving equipment for receiving EPG data is selected by the controller 204 employed in the EPG receiver 6 at a step S31. For example, let the IRD 4 be specified as selected receiving equipment as described above. The processing flow then continues to a step S32 at which the controller 204 requests the IRD 4 specified as selected receiving equipment at the step S31 to receive EPG data. Receiving this request, the IRD 4 reads out EPG data in accordance with the request and then outputs the EPG data to the EPG receiver 6. These processings are the same as those carried out at the steps S21 and S22 shown in FIG. 7.

Subsequently, the processing flow continues to a step S33 at which the controller 204 converts the EPG data received by the IRD 4 into data having a predetermined format (an integrated format). Then, the processing flow continues to a step S34 to store the data completing the conversion at the step S33 into the RAM unit 207.

The processing flow further returns to the step S31 to select other AV equipment, for example, the TV receiver 5. The processing flow then continues to the step S32 at which the controller 204 requests the TV receiver 5 specified as selected receiving equipment at the step S31 to receive EPG data. Receiving this request, the TV receiver 5 reads out EPG data in accordance with the request and then outputs the EPG data to the EPG receiver 6.

Subsequently, the processing flow continues to the step S33 at which the controller 204 converts the EPG data received by the TV receiver 5 into data having the integrated format. Then, the processing flow continues to the step S34 to store the data completing the conversion at the step S33 into the RAM unit 207.

As described above, EPG data of the AV equipment connected to the AV system 1 is stored into the RAM unit 207 in the integrated format.

That is to say, in the case of both the processings to store data as shown in FIGS. 7 and 8, EPG data received by the AV equipment connected to the AV system 1 is converted into a data base stored in the RAM unit 207. In the embodiment shown in FIG. 8, however, EPG data of the AV equipment is stored after conversion of the data into an integrated format. As a result, in the case of recording EPG data of programs of the IRD 4 and the TV receiver 5 having essentially the same contents (or programs having the same program name), whether they are of programs broadcasted at the same time or different times, only a piece of information common to both the programs is recorded while pieces of information not common to the programs such as broadcasting time bands and broadcasting areas are recorded as additional data. In this way, the required capacity of the RAM unit 207 can be made smaller.

By determining whether or not the leading parts of the program names (or the titles) of two programs (typically the first ten characters of the titles) match each other, it is possible to judge whether or not the two programs are the same. In the case of an EPG system adopting the VBI method or the digital satellite method, a uniform unique ID may be assigned to each program. In this case, by comparing the IDs to each other, it is possible to determine whether or not two programs are the same.

As another alternative, by comparing broadcasting channel names to each other, it is possible to determine whether or not two programs are the same. In this case, even if the broadcasting channel names are the same like in the case of a sport relay or the like, programs such as baseball games which programs differ from zone to zone (or service area to service area) may be broadcasted. For this reason, after determining that broadcasting channel names are the same, it is necessary to judge whether or not the program names are the same. If the program names are found different, processing to preserve the programs as different pieces of information is required.

On the top of that, by unifying the formats as described above, it is possible to search the data base for a desired program. That is to say, since EPG data of programs that can be received by the AV system 1 are stored as a single uniform data base, by searching the data base only once, it is possible to determine in a short time whether or not a desired program is a program that can be received by the AV system 1.

In addition, the EPG data of a program which was once viewed by the user can be deleted from the RAM unit 207 at a request of the user, allowing the storage area of the RAM unit 207 to be utilized more efficiently. In this case, the program name of the deleted program can be left unerased and stored in the RAM unit 207 as a history. In this way, the user can search the stored data for programs that the user has watched before.

As described above, the RAM unit 207 employed in the EPG receiver 6 always contains integrated EPG data that is stored therein as a data base.

Even though the integrated electronic program guide stored in the RAM unit 207 of the EPG receiver 6 as a single data base comprises programs of various systems, the original electronic program guides of the systems are basically different from each other.

In order to receive a program transmitted by satellite broadcasting, for example, the number of a transponder is required in addition to a channel number. When selecting a program transmitted by a ground wave, on the other hand, only a channel number is required and the number of a transponder is not. Accordingly, EPG data received by the IRD 4 includes transponder numbers while that received by the TV receiver 5 does not.

The EPG data of a program received by the TV receiver 5 includes a code required for recording the program through reservation by the VCR 2 or 3. However, such a code is not included in an electronic program guide received through satellite broadcasting.

The difference in code inclusion described above is preserved as it is in the EPG data even after integration.

Figure 9:
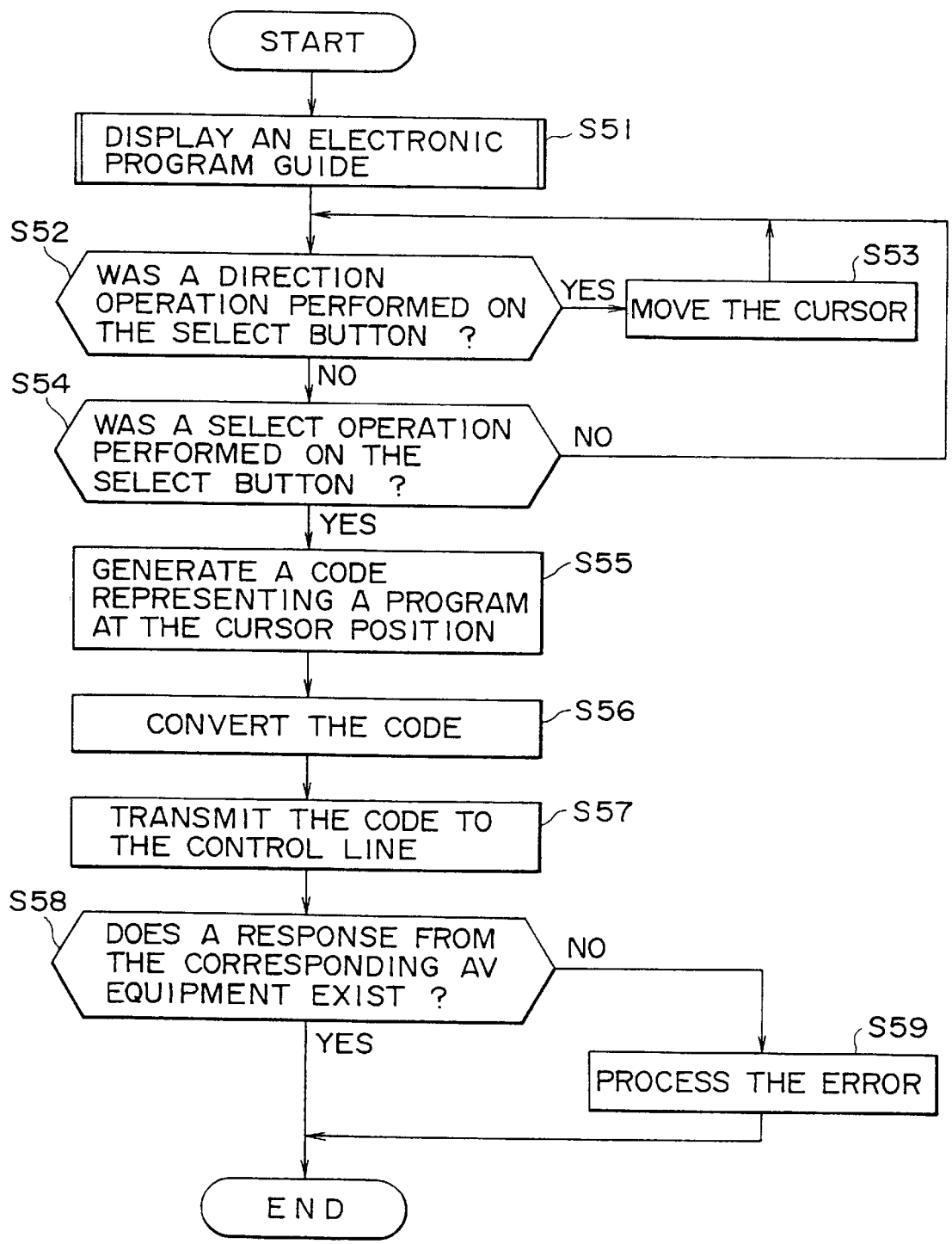
FIG. 9 shows a flowchart used for explaining an operation to select a program in the EPG receiver 6 shown in FIG. 2.

Next, processing to select a desired program is explained by referring to the flowchart shown in FIG. 9. This processing is started when the EPG button switch 243 of the EPG-receiver remote commander 241 is operated.

First of all, at a step S51, processing to display an electronic program guide is carried out. When the processing to store data in the RAM unit 207 is carried out in accordance with the flowchart shown in FIG. 7, the processing of the step S51 is performed in accordance with a flowchart shown in FIG. 10. When the processing to store data in the RAM unit 207 is carried out in accordance with the flowchart shown in FIG. 8, on the other hand, the processing of the step S51 is performed in accordance with a flowchart shown in FIG. 11.

Figure 10:
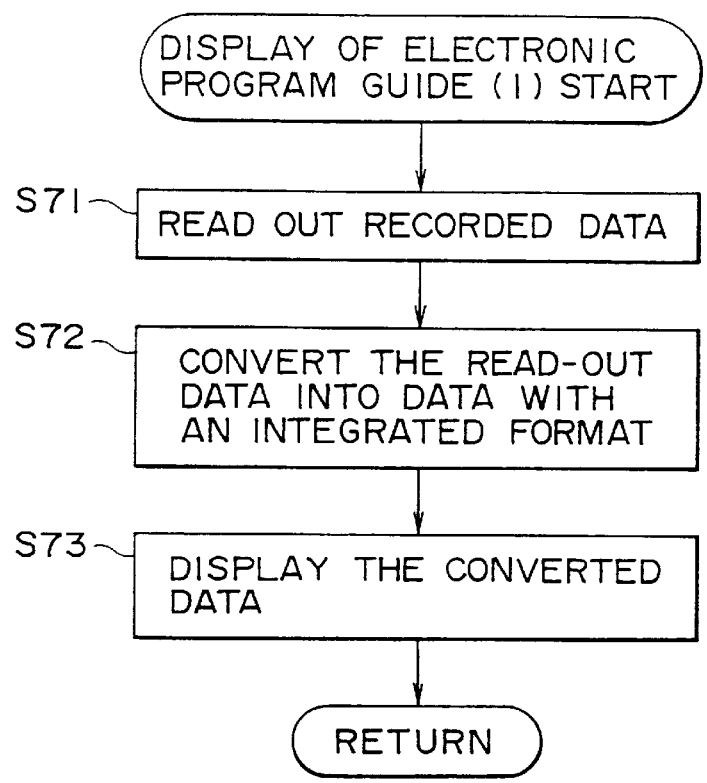
FIG. 10 shows a flowchart of typical processing to display an electronic program guide carried out at a step S51 of FIG. 9.

That is to say, when the processing to store data in the RAM unit 207 is carried out in accordance with the flowchart shown in FIG. 7 wherein the data is not converted into data with a uniform format, the processing of the step S51 is performed in accordance with a flowchart shown in FIG. 10 which begins with a step S71 to read out EPG data stored in the RAM unit 207. The processing flow then continues to a step S72 to convert the data into data with a uniform format. Then, the processing flow proceeds to a step S73 to execute processing to display the EPG data in the uniform format.

To put it concretely, the controller 204 converts the EPG data of the IRD 4 and the EPG data of the TV receiver 5, which EPG data is stored in the RAM unit 207, into data in an integrated display format. The data in the integrated format is then output to the TV receiver 5 through the AV-equipment control-signal transmitting/receiving unit 203 and the control line 12.

Receiving the EPG data through the AV-equipment control-signal transmitting/receiving unit 231, the controller 226 employed in the TV receiver 5 controls the generating circuit 227 for generating display data (or OSD data) based on the EPG data which display data is then output and displayed to the CRT 229 through the synthesizing circuit 228.

In this way, even though pieces of EPG data are not integrated in the RAM unit 207, at least at the display stage, the pieces of data of different pieces of AV equipment (or different systems) are output to the CRT 229 employed in the TV receiver 5 in an integrated format. As a result, the user can select a program among those of the different pieces of AV equipment by an operation which is carried out as if the program were selected among those of one type of AV equipment.

It should be noted that, when an electronic program guide is displayed, a condition for displaying the EPG data can further be set.

When the processing to store data into the RAM unit 207 is carried out in accordance with the flowchart shown in FIG. 8, on the other hand, the EPG data is stored in the RAM unit 207 in a format which has already been integrated. In this case, the processing to display EPG data is carried out at the step S51 shown in FIG. 9 in accordance with the flowchart shown in FIG. 11.

Figure 11:
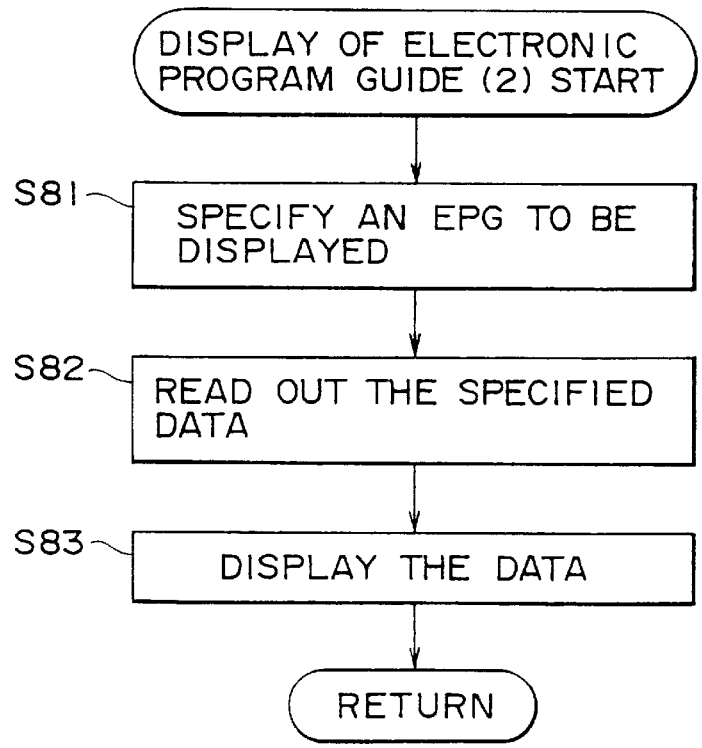
FIG. 11 shows a flowchart of other typical processing to display an electronic program guide carried out at the step S51 of FIG. 9.

As shown in FIG. 11, at an initial step S81, the user specifies a piece of EPG data to be displayed out of pieces of EPG data stored in the RAM unit 207. This operation to specify the EPG data corresponds to the processing to specify a recording condition carried out at the step S23 shown in FIG. 7. That is to say, in the case of the embodiment shown in FIG. 7, a condition is set in advance and EPG data according to this condition is stored in the RAM unit 207. In the case of the embodiment shown in FIG. 8, on the other hand, all types of EPG data are basically stored in the RAM unit 207. Then, a predetermined condition is set and specific AV data that satisfies the condition is read out from the RAM unit 207. For example, EPG data of a predetermined category or EPG data of a program having a predetermined program number can thereby be specified and displayed. As an alternative, in the case of programs which are recorded along with their actors and actresses playing on the stage, an actor or actress playing on the stage can be specified so as to read out the EPG data of a program of the specified actor or actress.

After such specification is done at the step S81, the processing flow proceeds to a step S82 to read out the specified data from the RAM unit 207. The processing flow then continues to a step S83 to carry out processing to display the data read out at the step S82.

That is to say, the controller 204 searches the data base stored in the RAM unit 207 for EPG data according to the specified condition. Data found out as a result of the search operation is then read out and output after appending an ODS data generating command for the TV receiver 5 thereto.

Similar to what has been described above, the controller 226 employed in the TV receiver 5 requests the generating circuit 227 to generate OSD data corresponding to the data supplied to the TV receiver 5 and outputs the OSD data to the CRT 229.

FIG. 12 shows a typical electronic program guide displayed on the CRT 229 through the processings described above. By comparing FIG. 12 to FIGS. 13 and 14 which show electronic program guides received by the IRD 4 and the TV receiver 5 respectively, it is obvious that the electronic program guide shown in FIG. 12 is obtained indeed as a result of integrating the electronic program guides shown in FIGS. 13 and 14.

It should be noted that, in case the capacity of the RAM unit 207 is not sufficient, an electronic program guide can be displayed by eliminating a portion of the EPG data like one shown in FIG. 15.

As the processing to display an electronic program guide carried out at the step S51 of FIG. 9 is completed, the processing flow continues to a next step S52 to determine whether or not a directional operation has been carried out on the select button switch 249 of the EPG-receiver remote commander 241. If a directional operation has been carried out, the processing flow continues to a step S53 to perform processing to move a cursor to the direction specified by the directional operation.

That is to say, the select button switch 249 of the remote commander 241 is found operated in the upward, downward, right or left direction. In this case, an infrared signal representing the directional operation is radiated by the IR generating unit 242 and then received by the IR receiving unit 6B. Receiving the direction-operation infrared signal through the IR receiving unit 6B, the controller 204 employed in the EPG receiver 6 requests the translator 205 to generate a cursor moving command to be issued to the TV receiver 5. The command is then output to the TV receiver 5 through the control line 12.

Receiving this incoming command, the controller 226 employed in the TV receiver 5 controls the generating circuit 227 so as to move the cursor of FIG. 12 shown on an electronic program guide displayed on the CRT 229 in a direction specified in the directional operation. The electronic program guide includes a vertical time axis and a horizontal channel axis. A program name is displayed at each broadcasting-time position of every channel. A program name to which the cursor is moved is selected.

The processing flow then continues to a step S54 to determine whether or not a select operation has been carried out on the select button switch 249 of the remote commander 241. If a select operation has not been carried out, the processing flow returns to the step S52 to repeat the processing to check the directional operation. After moving the cursor to a predetermined program, the user carries out a select operation in order to confirm the selection of the program by pressing down the select button switch 249. In this case, the select operation will be found carried out at the step S54 and the processing flow will continue to a step S55 at which the controller 204 execute processing to generate a command to select a program on which the cursor is positioned.

That is to say, when the controller 226 employed in the TV receiver 5 is informed of the select operation through the control line 12, the AV-equipment control-signal transmitting/receiving unit 231 is controlled thereby to output positional information indicating the current position of the cursor to the EPG receiver 6 through the control line 12.

Receiving the incoming positional information through the AV-equipment control-signal transmitting/receiving unit 203, the controller 204 employed in the EPG receiver 6 determines a program displayed at the position. Since the controller generates an electronic program guide displayed to the TV receiver 5 by itself, a program displayed at the position indicated by the positional information can be identified from the positional information.

Then, the controller 204 generates a command to receive the program, issuing the command to the AV equipment to receive the program. Assume, for example, that the selected program is a program received by the IRD 4 or a program broadcasted through a satellite. In this case, the command to receive the program is output to the IRD 4. If the selected program is a program received by the TV receiver 5 or a program broadcasted by a ground wave, on the other hand, the command to receive the program is output to the TV receiver 5.

The processing flow then proceeds to a step S56 at which the controller 204 transmits the generated command through the control line 12 to the translator 205 which is used for converting the command into a command code provided by the manufacturer of the destination AV equipment. In this case, the destination AV equipment is the IRD 4 or the TV receiver 5. The processing flow then continues to a step S57 at which the command code provided by the manufacturer of the destination AV equipment is transmitted to the AV equipment which is the IRD 4 or the TV receiver 5 in this case.

The command conversion processing is specially shown at the step S56 as a representative. As described earlier, however, the processing to store EPG data, the processing to move the cursor and other processings are also carried out properly.

Receiving the signal requesting the reception of the program through the AV-equipment control-signal transmitting/receiving unit 39, the IRD 4 controls the front-end unit 20 in order to request it to receive the specified program. As a result, the requested program is received and its video signal is transmitted to the TV receiver 5 through the AV line 11.

The TV receiver 5 outputs and displays the input video signal, which is received through the video-signal transmitting/receiving unit 230, to the CRT 229 through the synthesizing circuit 228.

On the other hand, receiving the signal requesting the reception of the program through the AV-equipment control-signal transmitting/receiving unit 231, the controller 226 employed in the TV receiver 5 controls the tuner 222 in order to request it to receive the specified program. As a result, the video signal received by the tuner 222 is output and displayed to the CRT 229 through the synthesizing circuit 228.

When the AV equipment (the IRD 4 or the TV receiver 5), which received the signal requesting the reception of the program, received the program of the specified channel, a status signal indicating the completion of the program reception is output to the EPG receiver 6 through the control line 12.

Receiving this status signal at a step S58 which status signal indicates the completion of the processing to receive the specified program, the controller 204 employed in the EPG receiver 6 ends the processing. If the specified program can not be received for some reasons, the status signal can not be received too. In this case, the processing flow continues to a step S59 to carry out error processing. Typically, the controller 204 generates an error message to be output and displayed to the TV receiver 5 through the control line 12.

In the embodiment described above, a variety of commands are input to the EPG receiver 6 through the EPG-receiver remote commander 241 provided specially for this purpose. As an alternative, an LCD panel 261 and a transparent touch panel 262 are provided in the EPG receiver 6 as shown in FIG. 16. A variety of signals can then be displayed on the LCD panel 261 whereas a variety of inputs can be entered to the EPG receiver 6 by touching the touch panel 262 using a finger. With such a configuration, it is possible to display an integrated electronic program guide on the LCD panel 261 and to select a desired program by manipulating the touch panel 262.

In the case of the above embodiments, description to merely select a desired program is given. It should be noted, however, that a selected program can of course be recorded by reservation in the VCR 2 and/or 3 as well.

In the embodiments described above, the special-purpose EPG-receiver remote commander 241 is provided for remotely controlling the EPG receiver 6. As an alternative, the system can be devised in such a way that the EPG receiver 6 can also be controlled by using a remote commander 7 for remotely controlling the other equipment such as the IRD 4 and the TV receiver 5. In such a scheme, when a variety of button switches on the remote commander 7 are operated, an infrared signal representing the operation is generated by the IR generating unit 51.

Receiving a control signal transmitted as the infrared signal through the IR receiving unit 4B, the CPU 29 employed in the IRD 4 outputs a command according to the control signal to the EPG receiver 6 through the remote control line 12. The controller 204 employed in the EPG receiver 6, in turn, carries out processing in accordance with the command which is received through AV-equipment control-signal transmitting/receiving unit 203.

In this case, by building the EPG receiver 6 into a configuration shown in FIG. 2, integrated-EPG data can be stored in the RAM unit 207 like the case described before.

It should be noted that, as an alternative, infrared signals radiated by the remote commander 7 can be directly received by the IR receiving unit 6B employed in the EPG receiver 6 so as to allow a variety of operations to be carried out.

In the embodiment described above, the EPG data of a program received by the IRD 4 and the IRD data of a program received by the TV receiver 5 are integrated into a third uniform format which is different from the formats of the EPG and the IRD data. As an alternative, the integration can also be done by conversion of the EPG format of a program received by the TV receiver 5 into the EPG format of a program received by the IRD 4 or, conversely, by conversion of the EPG format of a program received by the IRD 4 into the EPG format of a program received by the TV receiver 5.

With the EPG receiver 6 controlled by the remote commander 7 of the IRD 4, for example, the integration can be done by conversion of the EPG format of a program received by the TV receiver 5 into the EPG format of a program received by the IRD 4. The integrated EPG data can then be stored into the RAM unit 207 of the EPG receiver 6 or the EPG area 35A of the IRD 4. In this case, the RAM unit 207 of the EPG receiver 6 is not required as shown in FIG. 17.

Figures 17, 18:
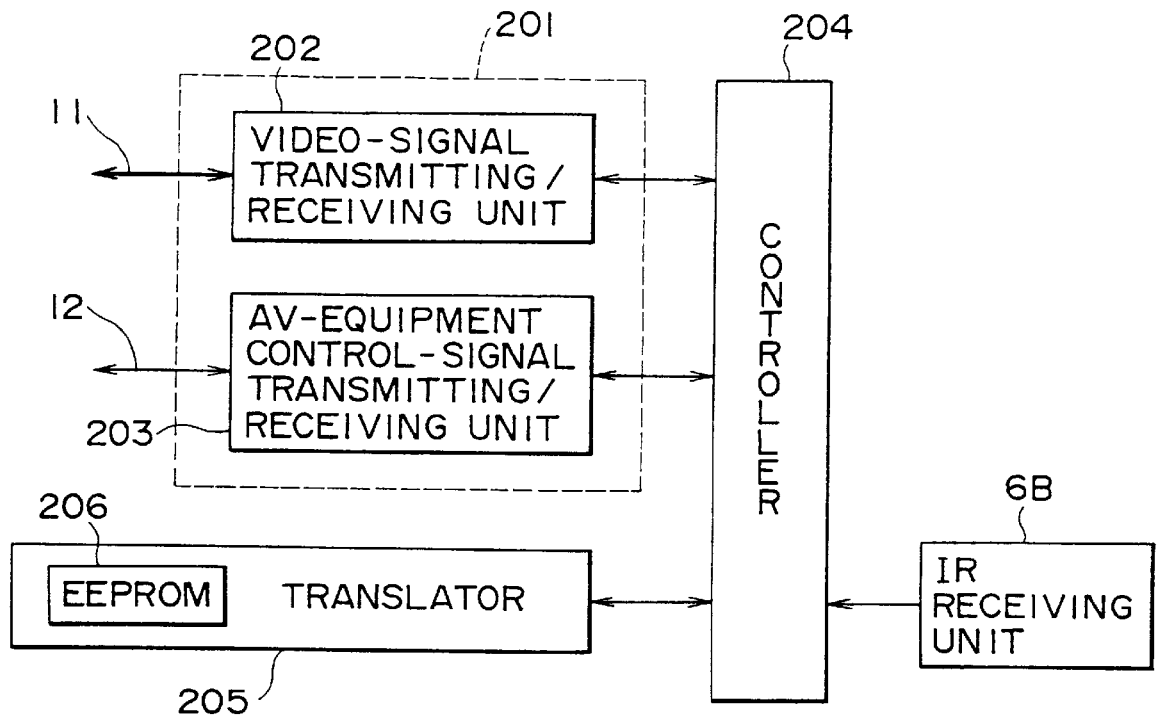
FIG. 17 is a block diagram showing still another typical configuration of the EPG receiver 6 shown in FIG. 1.
FIG. 18 is a diagram showing still another typical display resulting from the step S51 of FIG. 9.

FIG. 18 shows an example of the electronic program guide which is obtained by conversion of the EPG format of a program received by the TV receiver 5 into the EPG format of a program received by the IRD 4. As shown in the display example of FIG. 18, electronic program guides of different receiving systems can be used as a common electronic program guide as is the case with the display example shown in FIG. 12. On the top of that, in the case of this example, a new third format is not introduced so that the user can always select a desired program or carry out other operations as if the user were operating an electronic program guide of the IRD 4.

Figure 19:
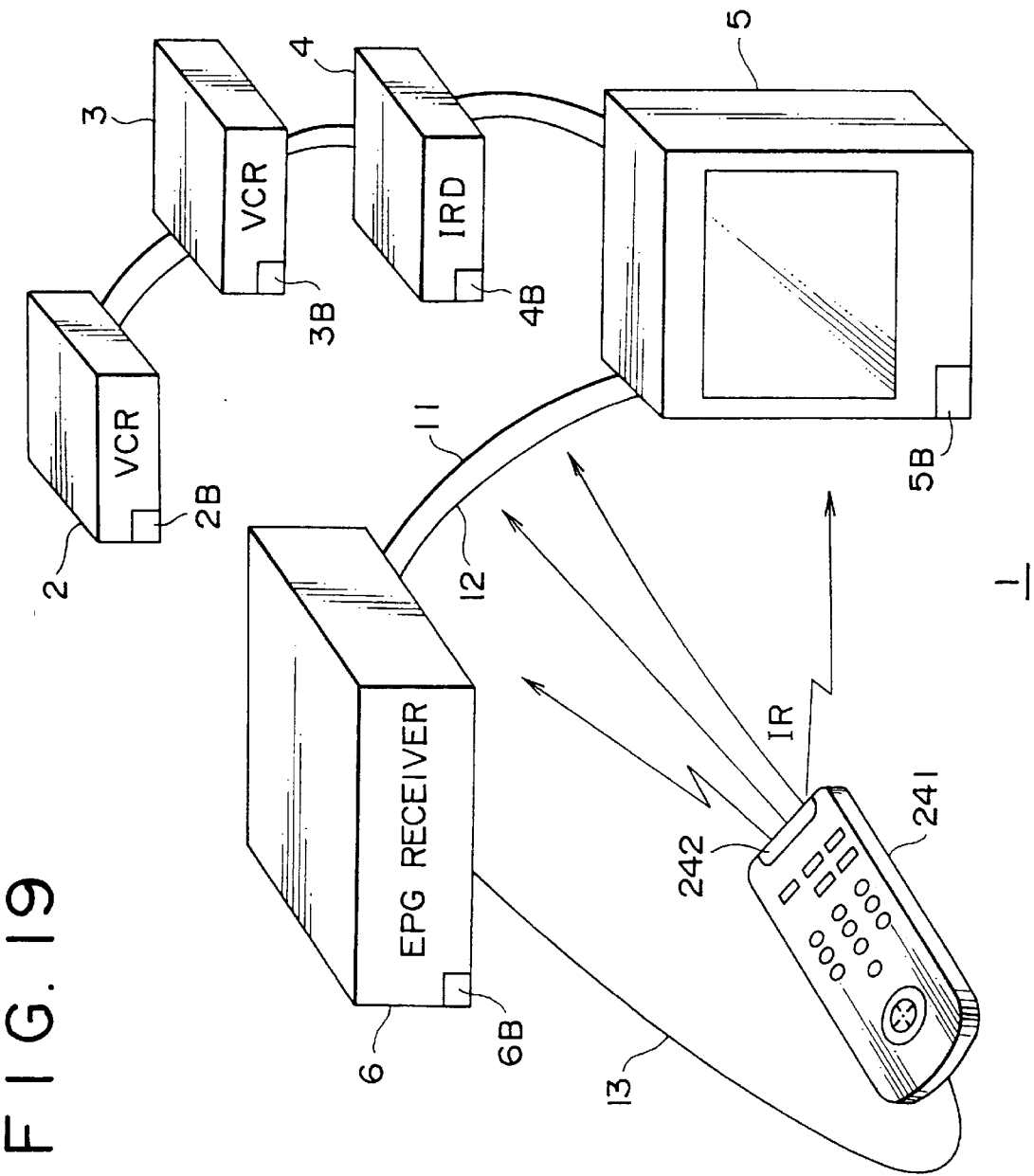
FIG. 19 is a diagram showing another typical configuration of an AV system adopting an electronic program guide system provided by the present invention.

In the case of the embodiment described above, only the EPG receiver 6 is remotely controlled by the EPG-receiver remote commander 241. As an alternative, the EPG receiver 6 is connected to the remote commander 241 by a control line 13 as shown in FIG. 19 and other pieces of AV equipment are controlled directly by infrared signals generated by the remote commander 241. In such a configuration, IR receiving units 2B and 3B are provided in the VCRs 2 and 3 respectively as the IR receiving units 4B and 5B are provided in the IRD 4 and the TV receiver 5 respectively. A command output by the EPG receiver 6 to other AV equipment is used to control the remote commander 241 through the control line 13 which remote commander 241 then generates an infrared signal for controlling the AV equipment.

Figure 20:
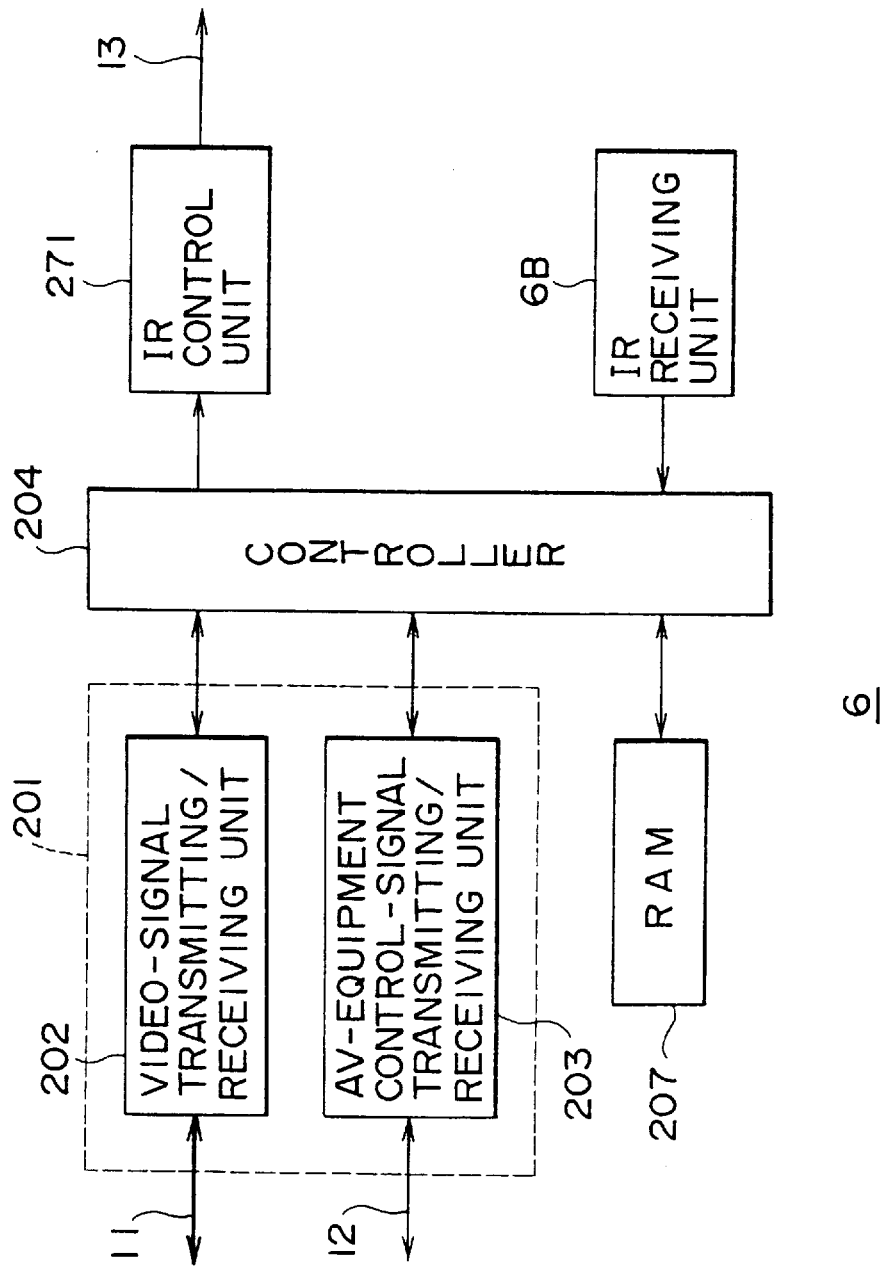
FIG. 20 is a block diagram showing a typical configuration of an EPG receiver 6 shown in FIG. 19.
Figure 21:
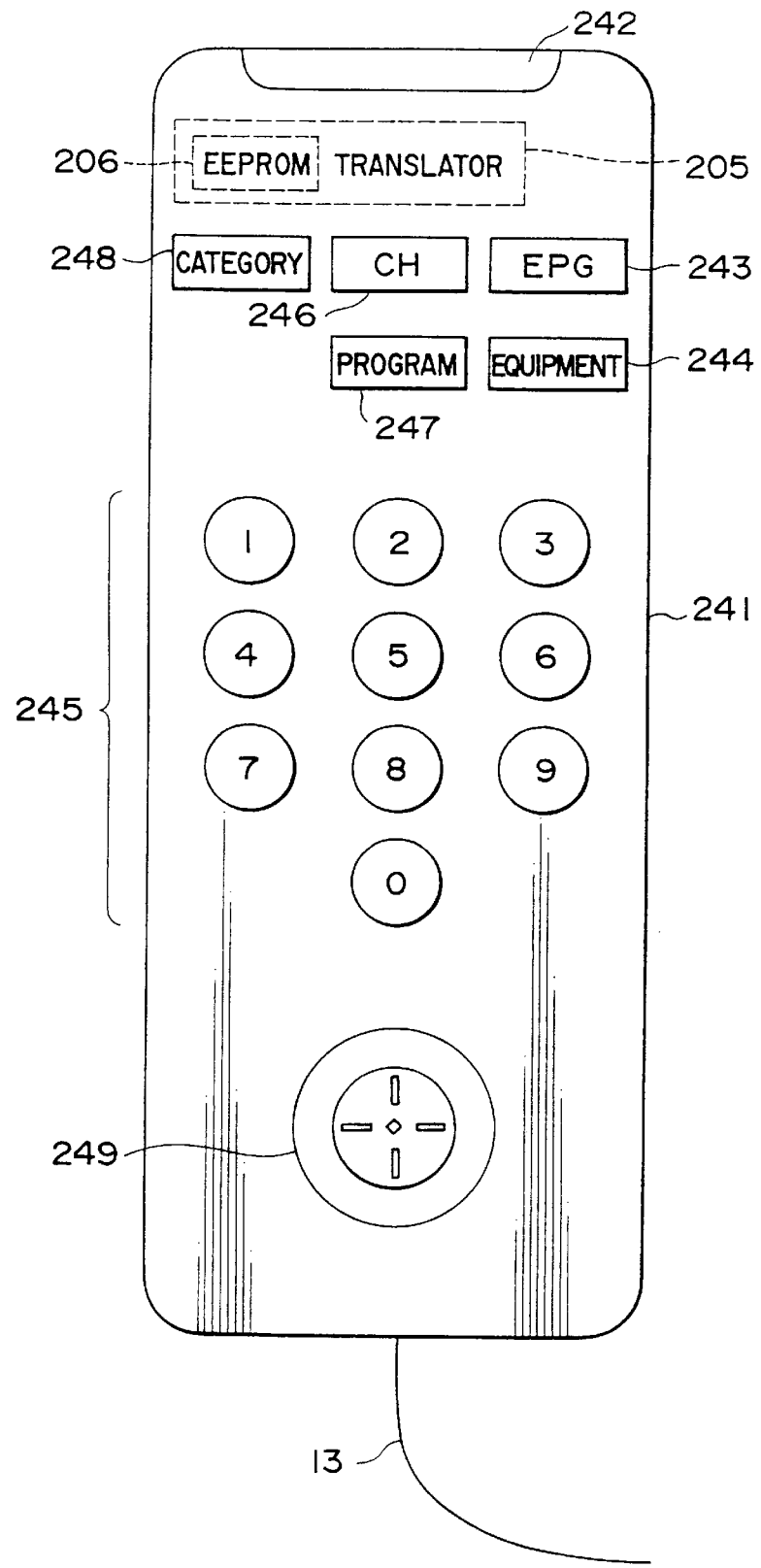
FIG. 21 is a block diagram showing a typical configuration of an EPG-receiver remote commander 241 shown in FIG. 19.

In this case, the EPG receiver 6 is provided with an IR controlling unit 271 typically as shown in FIG. 20. The translator 205 is not provided in the EPG receiver 6 but embedded in the EPG-receiver remote commander 241 as shown in FIG. 21. This is because the translator 205 is required by the remote commander 241 when a command is output to other AV equipment.

In order to output a command to other AV equipment, the controller 204 controls the IR controlling unit 271, transmitting a signal to the remote commander 241 through the control line 13. The remote commander 241 receives the incoming signal, converting the signal by means of the translator 205 into a command interpretable by the other AV equipment which command is then output as an infrared signal.

It should be noted that, since the IRD 4 and the TV receiver 5 need to receive transmitted EPG data, it is necessary to connect the EPG receiver 6 to other AV equipment at least by the control line 12.

Figure 22:
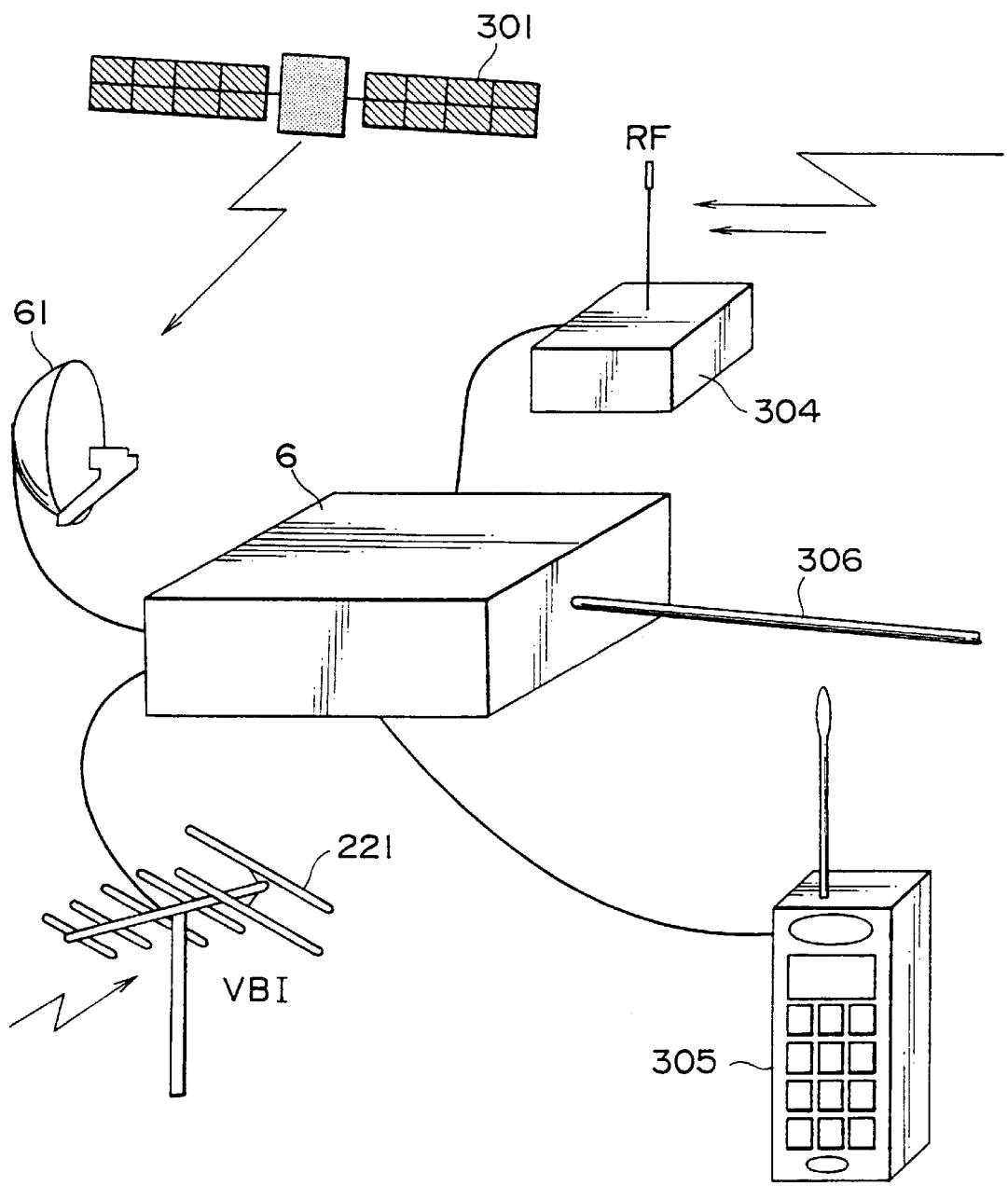
FIG. 22 is a diagram used for explaining control of the display for a system comprising a plurality of EPG receivers.

As shown in a model of FIG. 22, EPG data is received by the TV receiver 5 through an antenna 221 for receiving ground waves and EPG data conveyed by waves transmitted by a satellite 301 is received by the IRD 4 through an antenna 61. It is worth noting that, in addition, other kinds of EPG data can also be received through a pager 304, a cable 306, a wireless telephone 305 or the like and then integrated with the EPG data received through the antennas 221 and 61.

Figure 23:
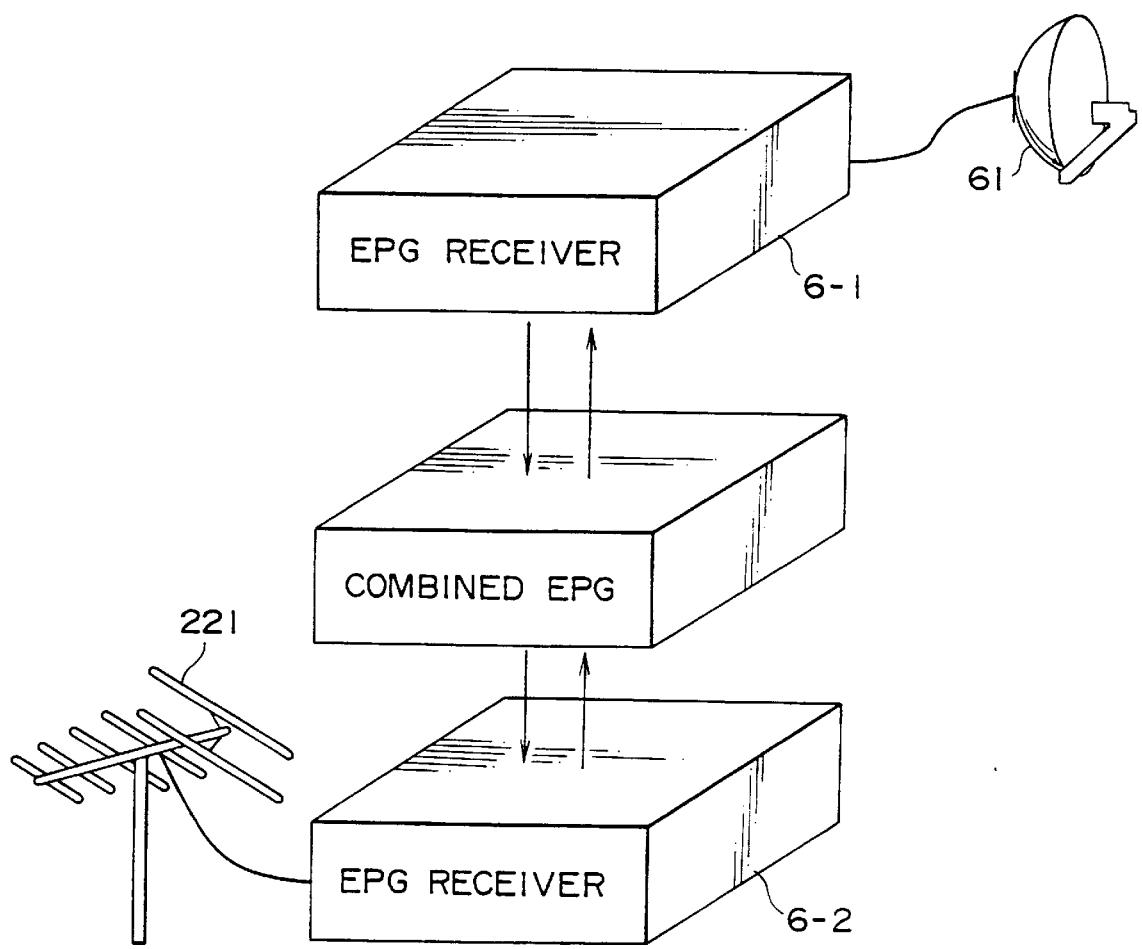
FIG. 23 is a diagram used for explaining the integration of EPG data of a plurality of EPG receivers.

When a plurality of EPG receivers (such as EPG receivers 6-1 and 6-2 shown in FIG. 23) are used, an integrated EPG (or a combined EPG) is generated. The integrated EPG can be stored in the EPG receiver 6-1, the EPG receiver 6-2 or another apparatus.

Figure 24:
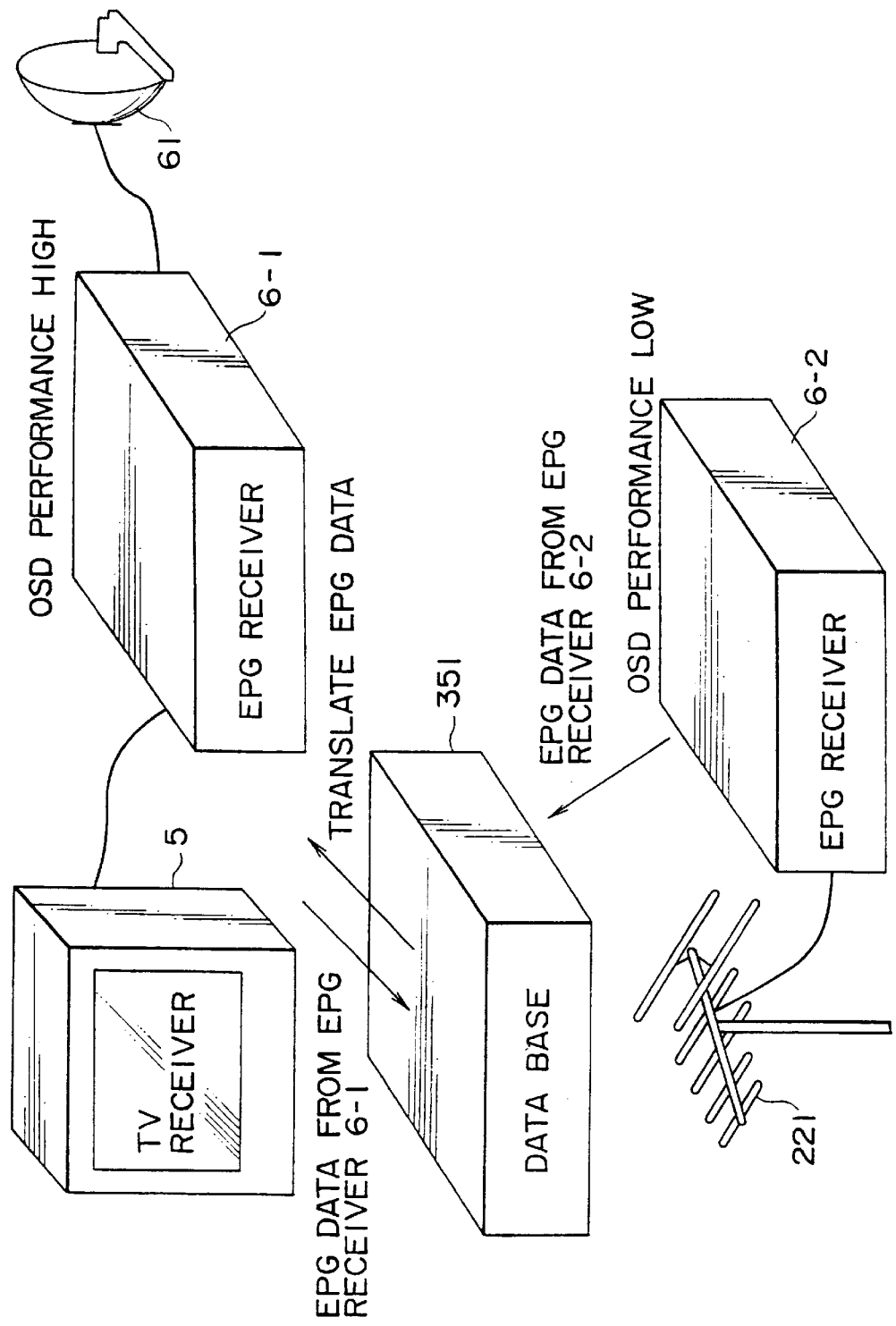
FIG. 24 is a diagram used for explaining an operation to display data in a system comprising a plurality of EPG receivers.

In addition, when a plurality of EPG receivers are used as shown in FIG. 24, an EPG receiver having the most excellent display function (the most excellent OSD function) is used to exhibit actual displays.

In the embodiment shown in FIG. 24, for example, let the EPG receiver 6-1 for receiving EPG data through an antenna 61 for receiving waves broadcasted from a satellite have a display function superior to that of the EPG receiver 6-2 for receiving EPG data through the antenna 221 for receiving ground waves. A data base 351 is created by integrating the EPG data received by the EPG receivers 6-1 and 6-2. The control to display EPG data integrated in the data base to the TV receiver 5 is, however, carried out by the EPG receiver 6-1 instead of the EPG receiver 6-2. By doing so, the EPG data of the EPG receiver 6-2 which has an inferior display function is also displayed as if the display function were superior.

In the case of the embodiments described above, pieces of EPG data of different systems are integrated at each home. As an alternative, at a predetermined relay base station 321, various kinds of EPG data can be received individually through antennas 322 to 324 and a cable 325 for integration as shown in FIG. 25. Each home can then request the relay base station 321 through, typically, a telephone line 330 to provide specific integrated EPG data.

In response to such a request, the requested integrated EPG data is transmitted to a requesting home through one of antennas 326 to 328 or a cable 329.

In this case, in order to enable the relay base station 321 to extract only EPG data in its service area, postal codes (or zip codes) or the like can be included in transmitted EPG data. A postal code is mail-matter delivery-area information used for identifying an area to which a mail matter is to be delivered. On the receiving side, by specifying a postal code for its service area, it is possible to extract only EPG data having the specified postal code of the service area. Then, only the extracted EPG data is integrated.

In the U.S.A., for example, the broadcasting time of a program of EPG data transmitted through a satellite includes offset information for the daylight saving time correction. In addition, in the U.S.A., there are four standard times: the PST (Pacific Standard Time), the MSD (Mountain Standard Time), the CST (Central Standard Time) and the EST (Eastern Standard Time). Accordingly, the broadcasting times of an EPG used in an area must be displayed for the user by considering one of the four standard times which is determined depending upon the area of the user. As a result, time-zone correction is also required. Each of the standard times is displayed as an offset from the Greenwich standard time.

The relay base station 321 must therefore correct the offset time depending upon the area and, in addition, carry out the daylight saving time correction by using the offset information transmitted through the satellite. In this way, integrated EPG data can be produced.

It should be noted that the EPG receiver 6 can embed a receiving circuit dedicated for receiving all EPG data of the AV system 1.

As described above, by using the electronic program guide system and the electronic program guide displaying system according to the present invention, a first electronic program guide and a second electronic program guide can be integrated, allowing the operatability to be improved and a desired program to be selected in a short time and at a high degree of reliability.

In addition, in an electronic program guide system according to the present invention, mail-matter delivery-area information is used as information for identifying an area in the selection of an electronic program guide of a predetermined area from electronic program guides which differ from area to area, allowing a desired electronic program guide to be selected in a short time and at a high degree of reliability with small areas used as a unit.

What is claimed is:

1. An electronic program guide system comprising:
   storage means for storing a first electronic program guide of a first system and a second electronic program guide of a second system differing from said first system; and
   an integrating system for integrating said first and second electronic program guides into an integrated electronic program guide, wherein said integrating system integrates said first and second electronic program guides in a predetermined uniform format different from formats of said first and second systems which formats are also different from each other.

2. An electronic program guide system according to claim 1, wherein said storage means stores said first and second electronic program guides after said integrating system integrates said first and second electronic program guides.

3. An electronic program guide system according to claim 1, wherein said storage means stores said first and second electronic program guides before said integrating system integrates said first and second electronic program guides, and said integrating system integrates said first and second electronic program guides when said first and second electronic program guides are read out from said storage means.

4. An electronic program guide system comprising:
   storage means for storing a first electronic program guide of a first system and a second electronic program guide of a second system differing from said first system; and
   an integrating system for integrating said first and second electronic program guides into an integrated electronic program guide, wherein said integrating system integrates said first and second electronic program guides by adjusting said first electronic program guide to a first predetermined format of said second electronic program guide or adjusting said second electronic program guide to a second predetermined format of said first electronic program guide.

5. An electronic program guide system according to claim 1, further comprising receiving means for receiving said first and second electronic program guides from said first and second systems respectively.

6. An electronic program guide system according to claim 1, further comprising generating means for generating display data of said integrated electronic program guide.

7. An electronic program guide system according to claim 6, further comprising specifying means for specifying a condition for displaying said integrated electronic program guide.

8. An electronic program guide system according to claim 6, further comprising display means for displaying said integrated electronic program guide based on said display data generated by said generating means.

9. An electronic program guide system comprising:

storage means for storing a first electronic program guide of a first system and a second electronic program guide of a second system differing from said first system;

an integrating system for integrating said first and second electronic program guides into an integrated electronic program guide;

selecting means for selecting a desired program from said integrated electronic program guide;

generating means for generating a first command for specifying said desired program selected by said selecting means; and converting means for converting said first command generated by said generating means into a second command of a third system to which said desired program belongs.

10. An electronic program guide system according to claim 9, wherein said converting means has a rewritable memory.

11. An electronic program guide system according to claim 9, wherein said converting means is provided to a remote commander.

12. An electronic program guide displaying method comprising steps of:

storing a first electronic program guide of a first system and a second electronic program guide of a second system differing from said first system;

integrating said first and second electronic program guides into an integrated electronic program guide by adjusting said first program guide to a first predetermined format of said second electronic program guide or adjusting said second electronic program guide to a second predetermined format of said first electronic program guide; and displaying said integrated electronic program guide.

13. An electronic program guide system for transmitting electronic program guides different from area to area and selecting an electronic program guide of a predetermined area on a receiving side of said electronic program guide system, wherein said electronic program guide contains mail-matter delivery-area information and said mail-matter delivery-area information is used for identifying an area to which mail matter is to be delivered.

14. An electronic program guide system according to claim 4, wherein said storage means stores first and second electronic program guides after said integrating system integrates said first and second electronic program guides.

15. An electronic program guide system according to claim 4, wherein said storage means stores first and second electronic program guides before said integrating system integrates said first and second electronic program guides, and said integrating system integrates said first and second electronic program guides when said first and second electronic program guides are read out from said storage means.

16. An electronic program guide system according to claim 4, further comprising receiving means for receiving said first and second electronic program guides from said first and second systems, respectively.

17. An electronic program guide system according to claim 4, further comprising generating means for generating display data of said integrated electronic program guide.

18. An electronic program guide system according to claim 17, further comprising specifying means for specifying a condition for displaying said integrated electronic program guide.

19. An electronic program guide system according to claim 17, further comprising display means for displaying said integrated electronic program guide based on said display data generated by said generated means.

20. An electronic program guide displaying method comprising steps of:

storing a first electronic program guide of a first system and a second electronic program guide of a second system differing from said first system;

integrating said first and second electronic program guides into an integrated electronic program guide by integrating said first and second electronic program guides in a predetermined uniform format different from formats of said first and second systems which formats are also different from each other; and displaying said integrated electronic program guide.

21. An electronic program guide system comprising:

first receiving means for receiving a broadcasting signal of a first system;

second receiving means for receiving a broadcasting signal of a second system differing from said first system;

storage means for storing a first electronic program guide of said first system and a second electronic program guide of said second system;

display means for displaying said first and second electronic program guides;

selecting means for selecting a desired program from the displayed first and second electronic program guides, generating means for generating a command to tune the desired program selected by said selecting means, determining means for determining which system of said first and second systems broadcasts the selected program; and transmitting means for transmitting said generated command in response to a system determination of said determining means.

* * * * *